US012798455B2

(12) United States Patent
Hotta et al.

(10) Patent No.: US 12,798,455 B2
(45) Date of Patent: Nov. 17, 2026

(54) SEAT CUSHION AIRBAG AND SEAT CUSHION AIRBAG DEVICE

(71) Applicant: TOYODA GOSEI CO., LTD., Kiyosu (JP)

(72) Inventors: Masashi Hotta, Kiyosu (JP); Koji Kawamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 119 days.

(21) Appl. No.: 18/813,308

(22) Filed: Aug. 23, 2024

(65) Prior Publication Data

US 2025/0108738 A1 Apr. 3, 2025

(30) Foreign Application Priority Data

Sep. 28, 2023 (JP) ................................ 2023-168907

(51) Int. Cl.
*B60N 2/427* (2006.01)
*A47C 4/54* (2006.01)
*B60N 2/66* (2006.01)
*B60N 2/90* (2018.01)

(52) U.S. Cl.
CPC ............ *B60N 2/42763* (2013.01); *A47C 4/54* (2013.01); *B60N 2/42718* (2013.01); *B60N 2/665* (2015.04); *B60N 2/914* (2018.02)

(58) Field of Classification Search
CPC ....................... B60N 2/42763; B60N 2/42718; B60N 2/665; B60N 2/914; B60N 2/7082; A47C 4/54
See application file for complete search history.

(56) References Cited

U.S. PATENT DOCUMENTS 4,920,591 A * 5/1990 Sekido ..................... B60N 2/99 297/287
5,096,529 A * 3/1992 Baker ...................... A47C 4/54 156/290
7,549,674 B2 6/2009 Yoshikawa et al.
8,702,121 B2 4/2014 Yamashita et al.
10,427,565 B2 10/2019 Sasaki et al.
2018/0319296 A1 11/2018 Sasaki et al.

FOREIGN PATENT DOCUMENTS

JP 2018-188123 A 11/2018

OTHER PUBLICATIONS

Office Action dated Jun. 2, 2026 issued in the corresponding Japanese Patent Application No. 2023-168907 (and English translation).

* cited by examiner

*Primary Examiner* — Syed A Islam
(74) *Attorney, Agent, or Firm* — Posz Law Group, PLC

(57) ABSTRACT

A seat cushion airbag 11 connected to an inflation fluid generation source 10 and configured to be expanded and inflated by an inflation fluid being supplied to an inside of the seat cushion airbag 11,
the seat cushion airbag 11
being disposed, in a seat portion 91 of a seat 90 for a vehicle, in a region below a seat surface 93 and between a center portion and a front end portion in a front-rear direction of the seat portion 91, and
in expansion and inflation,
having a side portion 11*s* between a top portion 11*t* and a bottom portion 11*b*, and
having, in at least two opposing regions in the side portion 11*s*, a standing wall 20 extending in an up-down direction.

20 Claims, 12 Drawing Sheets

SEAT CUSHION AIRBAG AND SEAT CUSHION AIRBAG DEVICE

TECHNICAL FIELD

The present invention relates to a seat cushion airbag and a seat cushion airbag device including the seat cushion airbag.

BACKGROUND ART

A phenomenon (so-called submarine phenomenon) in which an occupant slips off from the seat surface of a seat to the lower front side has been known to occur at the time of occurrence of an impact, for example, at the time of collision of a vehicle.

The front side, frontward, etc., in the present specification mean the front side, frontward, etc., in the front-rear direction based on the body of an occupant sitting on the seat portion of a seat. Similarly, the rear side, rearward, etc., also mean the rear side, rearward, etc., in the front-rear direction based on the body of an occupant sitting on the seat portion of a seat. In the present specification, a width direction described later means the direction horizontal and orthogonal to the front-rear direction.

The above submarine phenomenon is considered to be caused by the waist portion of the occupant moving frontward when the vehicle is subjected to an impact from the front, and slipping under the waist strap (also referred to as waist belt or lap strap), of the seat belt, for restraining the waist portion of the occupant.

In order to inhibit occurrence of the above submarine phenomenon, a technology of providing an airbag referred to as a seat cushion airbag on the lower side with respect to the seat surface of a seat, more specifically, inside the seat portion, has been proposed (e.g., see JP2018188123 (A)).

According to the technology described in JP2018188123 (A), a seat cushion airbag is expanded and inflated at occurrence of an impact, to raise the seat surface of the seat. The seat cushion airbag is considered to be expanded and inflated below the region from the ischium to the thighs of the occupant, and accordingly, the frontward movement amount of the waist portion of the occupant is considered to be reduced. In addition, since the seat surface is raised, the waist portion of the occupant is also raised. Therefore, the waist portion of the occupant is less likely to slip under the waist strap, whereby the occupant is highly reliably restrained to the seat by the seat belt. Accordingly, the above submarine phenomenon is considered to be less likely to occur.

SUMMARY OF INVENTION

Technical Problem

As described above, the seat cushion airbag described in JP2018188123 (A) is expanded and inflated at occurrence of an impact. In this expansion and inflation, the seat cushion airbag is considered to raise the waist portion of the occupant from below with respect to the waist portion, and as a result, the upper body of the occupant is also considered to be raised.

Here, the occupant sits on the seat portion and the seat cushion airbag, and a downward load due to the occupant acts on the seat portion. Therefore, immediately after the expansion and inflation of the seat cushion airbag, the seat portion is difficult to be deformed upwardly by being obstructed by the occupant. That is, immediately after the expansion and inflation of the seat cushion airbag, the seat portion is deformed first downwardly where the seat portion is easily deformed and then, is deformed upwardly.

Therefore, the timing when the seat cushion airbag of this type raises the waist portion of the occupant tends to be slightly delayed from the time point of occurrence of the impact.

In order to more stably restrain the upper body of the occupant by a shoulder strap, the timing when the seat cushion airbag raises the waist portion of the occupant is preferably made as close as possible to the time point of occurrence of the impact.

The inventor of the present invention conducted intensive studies and found that, since the internal pressure of the seat cushion airbag in expansion and inflation is high, the above-described event in which the timing when the seat cushion airbag raises the waist portion of the occupant is delayed from the time point of occurrence of the impact occurs. Hereinafter, this event will be referred to as "time lag between impact occurrence and upward deformation of a seat cushion airbag" as necessary. In the present specification, unless otherwise specified, "in expansion and inflation" means "when the seat cushion airbag is expanded and inflated".

In consideration of the above finding, if the internal pressure of the seat cushion airbag in expansion and inflation is reduced, the time lag between impact occurrence and upward deformation of the seat cushion airbag is considered to be reduced.

This is because, if the internal pressure of the seat cushion airbag in expansion and inflation is reduced, downward deformation of the seat portion immediately after the expansion and inflation of the seat cushion airbag is considered to be inhibited.

However, if the internal pressure of the seat cushion airbag in expansion and inflation is low, the force supporting the body of the occupant from the lower side may become insufficient. In such a case as well, the upper body of the occupant may be difficult to be stably restrained by the shoulder strap.

The inventor of the present invention conducted further studies, and conceived of devising the shape of the seat cushion airbag to provide the seat cushion airbag with performances of reducing the time lag between impact occurrence and upward deformation of the seat cushion airbag and stably restraining the upper body of the occupant by the shoulder strap.

The present disclosure has been made in consideration of the above circumstances. A problem addressed by the present disclosure is to provide a seat cushion airbag that reduces the time lag between impact occurrence and upward deformation of the seat cushion airbag and that stably restrains the upper body of an occupant by a shoulder strap, and a seat cushion airbag device including the seat cushion airbag.

Solution to Problem

A seat cushion airbag of the present disclosure that solves the above problem is a seat cushion airbag connected to an inflation fluid generation source and configured to be expanded and inflated by an inflation fluid being supplied to an inside of the seat cushion airbag, the seat cushion airbag being disposed, in a seat portion of a seat for a vehicle, in a region below a seat surface and between a center portion and a front end portion in a front-rear direction of the seat portion, and in expansion and inflation, having a side portion between a top portion and a bottom portion, and having, in at least two opposing regions in the side portion, a standing wall extending in an up-down direction.

A seat cushion airbag device of the present disclosure that solves the above problem is a seat cushion airbag device including:

an inflation fluid generation source; and a seat cushion airbag connected to the inflation fluid generation source and configured to be expanded and inflated by an inflation fluid being supplied to an inside of the seat cushion airbag, the seat cushion airbag being disposed, in a seat portion of a seat for a vehicle, in a region below a seat surface and between a center portion and a front end portion in a front-rear direction of the seat portion, and in expansion and inflation, having a side portion between a top portion and bottom portion, and having, in at least two opposing regions in the side portion, a standing wall extending in an up-down direction.

According to the seat cushion airbag and the seat cushion airbag device of the present disclosure, the time lag between impact occurrence and upward deformation of the seat cushion airbag is reduced, and the upper body of an occupant is stably restrained by a shoulder strap.

DESCRIPTION OF EMBODIMENTS

A seat cushion airbag device of the present disclosure includes an inflation fluid generation source in addition to a seat cushion airbag of the present disclosure. Therefore, the following description regarding the seat cushion airbag of the present disclosure may be read as the seat cushion airbag in the seat cushion airbag device of the present disclosure.

The seat cushion airbag of the present disclosure is connected to the inflation fluid generation source.

At occurrence of an impact, an inflation fluid generated by the inflation fluid generation source is supplied to the inside of the seat cushion airbag, whereby the seat cushion airbag is expanded and inflated.

The seat cushion airbag is disposed, in the seat portion of a seat for a vehicle, in a region below the seat surface and between a center portion and a front end portion in the front-rear direction of the seat portion.

In the present specification, "rear" means the reverse direction of "front" already described. Further, "up" and "down" mean, in the seat cushion airbag in a state of being mounted to the seat portion of a seat in a vehicle, "up" in the vertical direction and "down" in the vertical direction, respectively.

When the seat cushion airbag of the present disclosure is expanded and inflated, the region, in the seat portion, between the center portion and the front end portion in the front-rear direction is deformed upwardly. At least a part of the region, in the seat portion, between the center portion and the front end portion in the front-rear direction matches the region from the ischium to the thighs of the occupant sitting on the seat portion of the seat. Therefore, at this time, the region from the ischium to the thighs of the occupant sitting on the seat portion of the seat is raised, and as a result, the waist portion of the occupant is raised.

Figure 13:
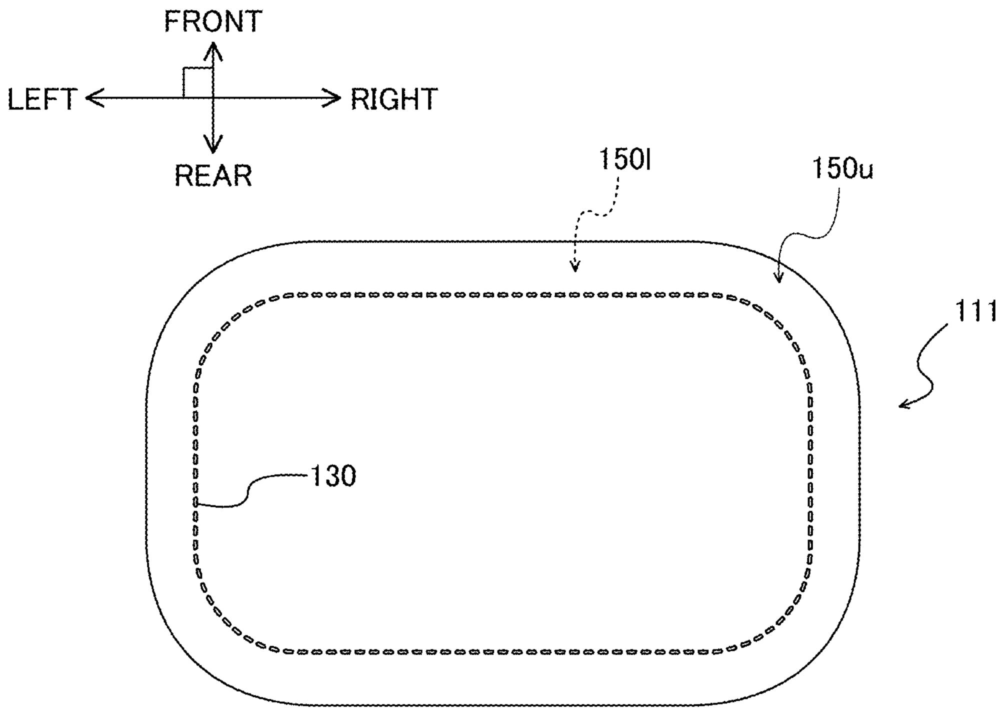
FIG. 13 is a schematic illustration of a conventional-type seat cushion airbag.
Figure 14:
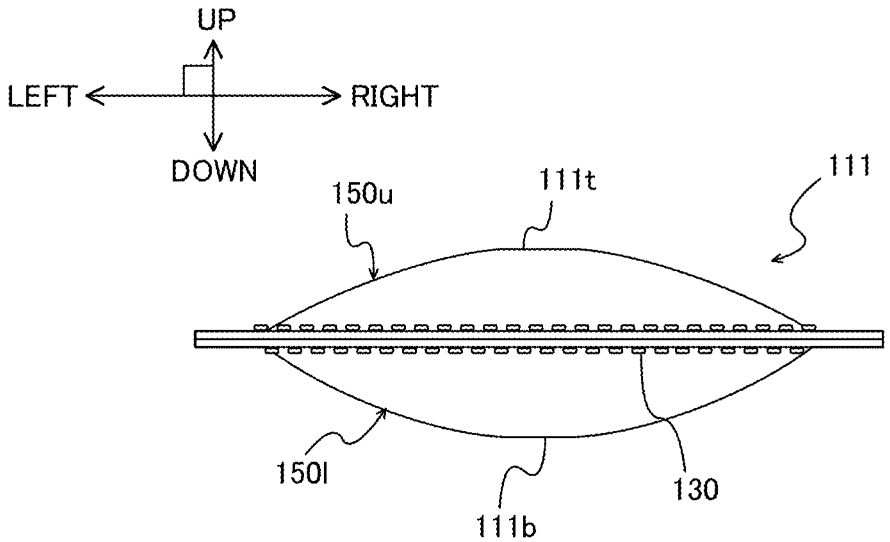
FIG. 14 is a schematic illustration of a conventional-type seat cushion airbag.
Figure 15:
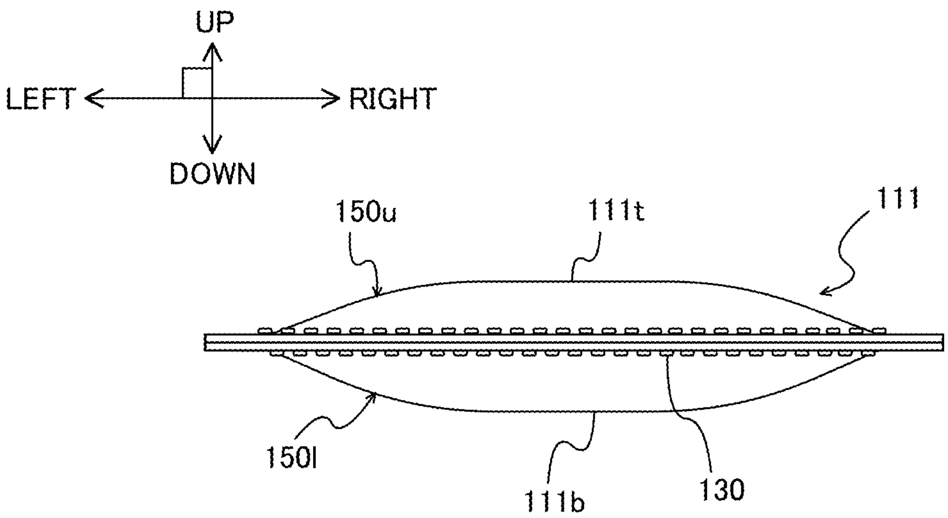
FIG. 15 is a schematic illustration of a conventional-type seat cushion airbag.

As shown in FIG. 13 to FIG. 15, a general conventional-type seat cushion airbag is obtained by sewing together an upper sheet 150*u* forming a top portion 111*t* of a seat cushion airbag 111 and a lower sheet 1501 forming a bottom portion 111*b* of the seat cushion airbag 111.

A seam 130 between the upper sheet 150*u* and the lower sheet 1501 is formed over the entirety in the circumferential direction along peripheral portions of the upper sheet 150*u* and the lower sheet 1501.

Figure 16:
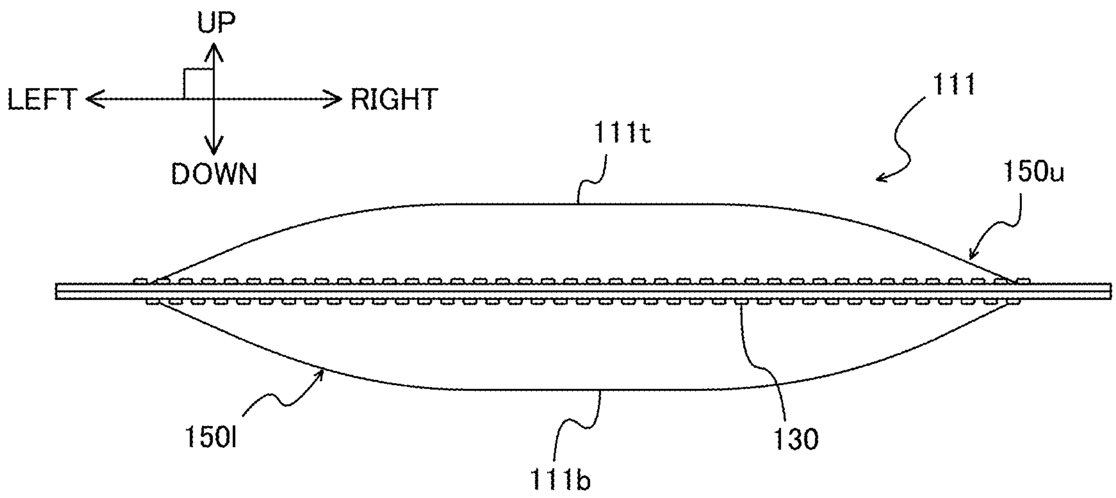
FIG. 16 is a schematic illustration of a conventional-type seat cushion airbag.

FIG. 13 is a schematic illustration of a general conventional-type seat cushion airbag viewed from above. FIG. 14 is a schematic illustration of the conventional-type seat cushion airbag having a high internal pressure, viewed from the front side. FIG. 15 is a schematic illustration of the conventional-type seat cushion airbag having a low internal pressure, viewed from the front side. FIG. 16 is a schematic illustration of a seat cushion airbag having a low internal pressure and a large external shape, viewed from the front side.

The conventional-type seat cushion airbag, in a normal state, i.e., when the seat cushion airbag is neither expanded nor inflated, has a flat shape having almost no thickness in the up-down direction. Then, as shown in FIG. 14, when the conventional-type seat cushion airbag is expanded and inflated at occurrence of an impact, the lower sheet 1501 is inflated downwardly to form the bottom portion 111*b*, and then, the upper sheet 150*u* is inflated upwardly to form the top portion 111*t*.

Here, since the conventional-type seat cushion airbag described above has a shape having almost no thickness in the up-down direction in the normal state, the conventional-type seat cushion airbag is difficult to be considered to be easily deformed in the up-down direction, particularly in the upward direction. Therefore, in the conventional-type seat cushion airbag, if the internal pressure in expansion and inflation is low, the position in the upward direction of the top portion is also low.

In order to stably restrain the upper body of the occupant by the shoulder strap at occurrence of an impact, the waist portion of the occupant sitting on the seat needs to be supported with a sufficient force from the lower side. Therefore, largely deforming the seat cushion airbag in the upward direction in expansion and inflation to cause the position in the upward direction of the top portion to be high to some extent is preferable.

Therefore, as shown in FIG. 14, in the conventional-type airbag, the internal pressure of the seat cushion airbag in expansion and inflation is set to a value that is high to some extent. Accordingly, the seat cushion airbag 111 is largely deformed to some extent in the upward direction, and accordingly, the position in the upward direction of the top portion 111*t* becomes high.

In contrast, as already described, when, in order to reduce the time lag between impact occurrence and upward deformation of the seat cushion airbag, the internal pressure of the seat cushion airbag 111 in expansion and inflation is set to a relatively low value, the position in the upward direction of the top portion 111*t* also becomes relatively low (FIG. 15).

When the external shape of the seat cushion airbag is made large, even if the internal pressure of the seat cushion airbag 111 in expansion and inflation is made low to some extent, the position in the upward direction of the top portion 111*t* is also made high (FIG. 16).

However, in this case, the seat cushion airbag 111 has an excessively large external shape, and is difficult to be considered to be appropriate for being disposed in the seat portion of a general seat.

The inventor of the present invention conceived of devising the shape of the seat cushion airbag into a shape easily deformed in the upward direction to reduce the time lag between impact occurrence and upward deformation of the seat cushion airbag.

When the seat cushion airbag has such a shape, even if the internal pressure in expansion and inflation is low to some extent, the position in the upward direction of the top portion is made sufficiently high, without making the external shape excessively large.

Specifically, in expansion and inflation, the seat cushion airbag of the present disclosure has a side portion between the top portion and the bottom portion. In at least two opposing regions in the side portion, the seat cushion airbag has a standing wall extending in the up-down direction.

In the seat cushion airbag of the present disclosure, the standing wall included in the side portion extends in the up-down direction in expansion and inflation. Therefore, the standing wall guides the deformation direction of the seat cushion airbag such that the position in the upward direction of the top portion becomes high in expansion and inflation.

The standing wall is also considered to contribute to causing the seat cushion airbag to be largely deformed in the upward direction in expansion and inflation.

According to the seat cushion airbag of the present disclosure having the standing wall in the side portion, even if the internal pressure in expansion and inflation is not so high, the position in the upward direction of the top portion becomes sufficiently high.

Accordingly, the seat cushion airbag of the present disclosure supports the waist portion of the occupant sitting on the seat with a sufficient force from the lower side, and accordingly, the upper body of the occupant is stably restrained by the shoulder strap.

According to the seat cushion airbag of the present disclosure, the internal pressure in expansion and inflation need not be set to be high, and thus, the time lag between impact occurrence and upward deformation of the seat cushion airbag is reduced.

Hereinafter, each component of the seat cushion airbag of the present disclosure and the seat cushion airbag device of the present disclosure will be described.

Unless otherwise mentioned in particular, a numerical value range "x to y" described in the present specification includes, in the range thereof, a lower limit "x" and an upper limit "y". A new numerical value range may be formed by arbitrarily combining such upper limit values, lower limit values, and numerical values described in embodiments. Furthermore, numerical values selected arbitrarily from any of the above numerical ranges may be used as numerical values for the upper and lower limits of the new numerical value range.

The seat cushion airbag of the present disclosure is a seat cushion airbag connected to an inflation fluid generation source and configured to be expanded and inflated by an inflation fluid being supplied to an inside of the seat cushion airbag, the seat cushion airbag being disposed, in a seat portion of a seat for a vehicle, in a region below a seat surface and between a center portion and a front end portion in a front-rear direction of the seat portion, and in expansion and inflation, having a side portion between a top portion and a bottom portion, and having, in at least two opposing regions in the side portion, a standing wall extending in an up-down direction.

The seat cushion airbag device of the present disclosure includes an inflation fluid generation source in addition to the seat cushion airbag of the present disclosure above.

The seat cushion airbag of the present disclosure is disposed in the seat portion of a seat for a vehicle. The seat portion is the part, in the seat, where an occupant sits and may include a frame and a cushion fixed to the frame. The seat may include a backrest, an armrest, and the like, in addition to the seat portion, for example.

The seat to which the seat cushion airbag of the present disclosure is mounted is not particularly limited, and for example, may be a front seat such as a driver's seat or a passenger seat, or may be a rear seat.

The seat cushion airbag of the present disclosure is disposed in a region, in the seat portion, between a center portion and a front end portion in the front-rear direction. In the present specification, "region, in the seat portion, between the center portion and the front end portion in the front-rear direction" is referred to as a front-side region of the seat portion as necessary.

With respect to the seat cushion airbag of the present disclosure, the entirety thereof may be disposed in the front-side region of the seat portion described above, or a part of the seat cushion airbag may be disposed on the rear side with respect to the front-side region of the seat portion.

In the seat cushion airbag of the present disclosure, when a part thereof is disposed on the rear side with respect to the front-side region of the seat portion, a large part of the seat cushion airbag is preferably disposed in the front-side region of the seat portion.

Specifically, in a projection view obtained by projecting, downwardly from above, the seat portion and the seat cushion airbag disposed in the seat portion, 30 area % or more of the seat cushion airbag is preferably disposed in the front-side region of the seat portion.

As already described, the seat cushion airbag of the present disclosure is disposed in the seat portion, and, in expansion and inflation, the seat cushion airbag itself is deformed and pushes up the seat surface of the seat portion in the upward direction.

Such a seat cushion airbag is preferably stored in the seat portion, in a state of being folded or collapsed in the normal state, and as the material for the seat cushion airbag, a material that is foldable and expandable is preferably selected.

As a specific material for the seat cushion airbag, a flexible and high-strength material is preferably selected. For example, a woven fabric using a high-strength resin fiber of polyester, polyamide, or the like is particularly preferably used.

The seat cushion airbag of the present disclosure is connected to an inflation fluid generation source for supplying an inflation fluid to the inside of the seat cushion airbag.

With respect to the inflation fluid generation source, a so-called inflator that generates a gas as the inflation fluid is preferably used. However, in some cases, an inflator that generates an inflation fluid other than a gas, e.g., a liquid, a gel, or the like, may be used.

The inflation fluid generation source may be any device for supplying the inflation fluid to the airbag, and may be, for example, of a so-called pyro-type having a gas generating agent that generates a gas as the inflation fluid, or of a so-called hybrid type that supplies a gas contained in a high pressure vessel by rupturing a separation wall of the high pressure vessel. The entirety of the inflation fluid generation source may be disposed outside the seat cushion airbag, or a part or the entirety of the inflation fluid generation source may be disposed inside the seat cushion airbag.)

In expansion and inflation, the seat cushion airbag of the present disclosure has a side portion between the top portion and the bottom portion. The side portion may be formed only in expansion and inflation, or may be formed in normal time in addition to in expansion and inflation.

Here, the top portion means a region, in the seat cushion airbag mounted to the seat portion of the seat, including an upper end portion in expansion and inflation and a peripheral portion thereof smoothly continuous with the upper end portion. The size and shape of the top portion may be any size and shape according to the shape of the seat cushion airbag, and the top portion may be in a line shape or a plane shape.

The top portion may three-dimensionally extend in the up-down direction, and the length thereof in the up-down direction varies depending on the shape of the seat cushion airbag, and thus is not particularly limited. In some cases, the side portion including the standing wall is formed so as to be continuous with the top portion, whereby the boundary between the top portion and the side portion or the standing wall may be ambiguous.

Meanwhile, the bottom portion means a region, in the seat cushion airbag mounted to the seat portion, including a lower end portion in expansion and inflation and a peripheral portion thereof smoothly continuous with the lower end portion. The size and shape of the bottom portion may also be any size and shape according to the shape of the seat cushion airbag, and the bottom portion may be in a line shape or a plane shape.

The bottom portion may also three-dimensionally extend in the up-down direction, and the length thereof in the up-down direction varies depending on the shape of the seat cushion airbag, and thus is not particularly limited. In some cases, the side portion including the standing wall is formed so as to be continuous with the bottom portion, whereby the boundary between the bottom portion and the side portion or the standing wall may be ambiguous.

The side portion is present between the top portion and the bottom portion described above, in expansion and inflation. In expansion and inflation, the top portion and the bottom portion are at different positions in the up-down direction. Therefore, the side portion is considered to be present between the top portion and the bottom portion in the up-down direction of the seat cushion airbag. The side portion is present between the top portion and the bottom portion over the entirety in the circumferential direction of the seat cushion airbag.

In the present specification, the circumferential direction of the seat cushion airbag means the direction in which the side portion extends in the seat cushion airbag.

The top portion, the bottom portion, and the side portion described above are parts that are also present in the conventional-type seat cushion airbag as shown in FIG. 13 to FIG. 16.

The seat cushion airbag of the present disclosure has, in at least two opposing regions in the above-described side portion, the standing wall extending in the up-down direction.

The standing wall of the seat cushion airbag of the present disclosure may form only a part of the side portion described above, or may form the entirety of the side portion. In other words, the standing wall may be present between the top portion and the bottom portion only in a part in the circumferential direction of the seat cushion airbag, or may be present between the top portion and the bottom portion over the entirety in the circumferential direction of the seat cushion airbag.

The standing wall of the seat cushion airbag of the present disclosure is also considered to have a gusset shape, i.e., a shape of so-called insertion cloth that is added to a part where the thickness is insufficient in the conventional-type seat cushion airbag composed of only an upper sheet and a lower sheet as shown in FIG. 13 to FIG. 16.

For example, the standing wall of the seat cushion airbag of the present disclosure may be formed integrally with the top portion and/or the bottom portion. Alternatively, the standing wall may be formed separately from the top portion and/or the bottom portion, and then, joined to the top portion and/or the bottom portion to be integrated.

In the present specification, joining is a concept including sewing with a sewing thread, binding with use of various types of joining materials represented by a staple, adhering with use of an adhesive, and welding.

Figure 17:
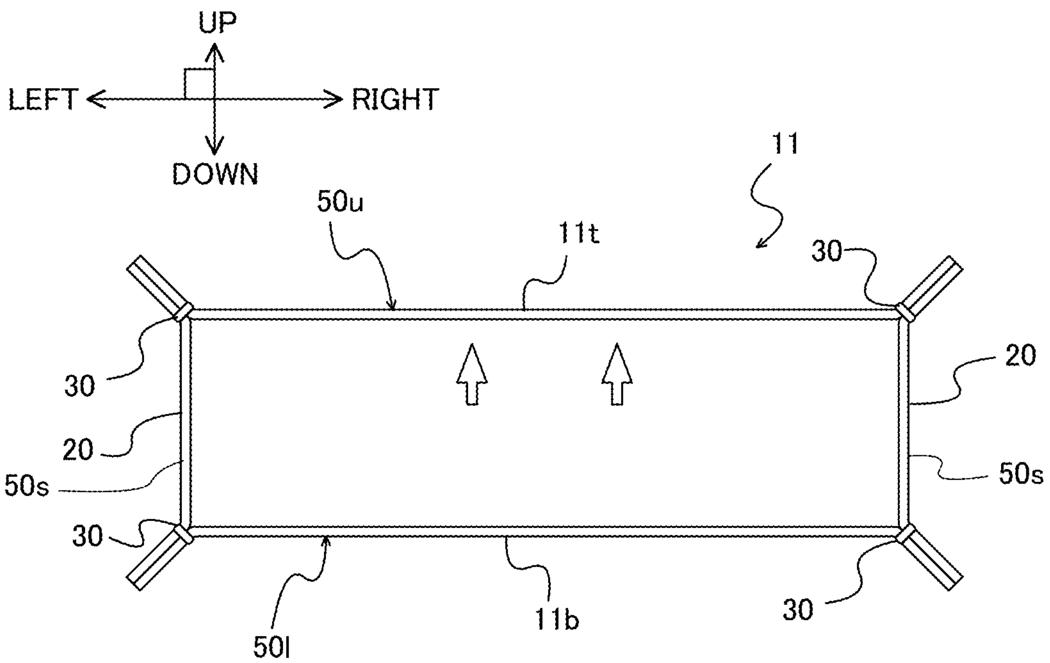
FIG. 17 is a schematic illustration of a mode of the seat cushion airbag of the present disclosure.

For example, as shown in FIG. 17, a seat cushion airbag 11 of the present disclosure may be formed by joining a gusset body 50*s* being a body separate from an upper sheet 50*u* and a lower sheet 50*l*, to the upper sheet 50*u* and the lower sheet 50*l*, to be integrated. When the seat cushion airbag 11 is expanded and inflated, a standing wall 20 is formed by a part of the gusset body 50*s*.

Figure 18:
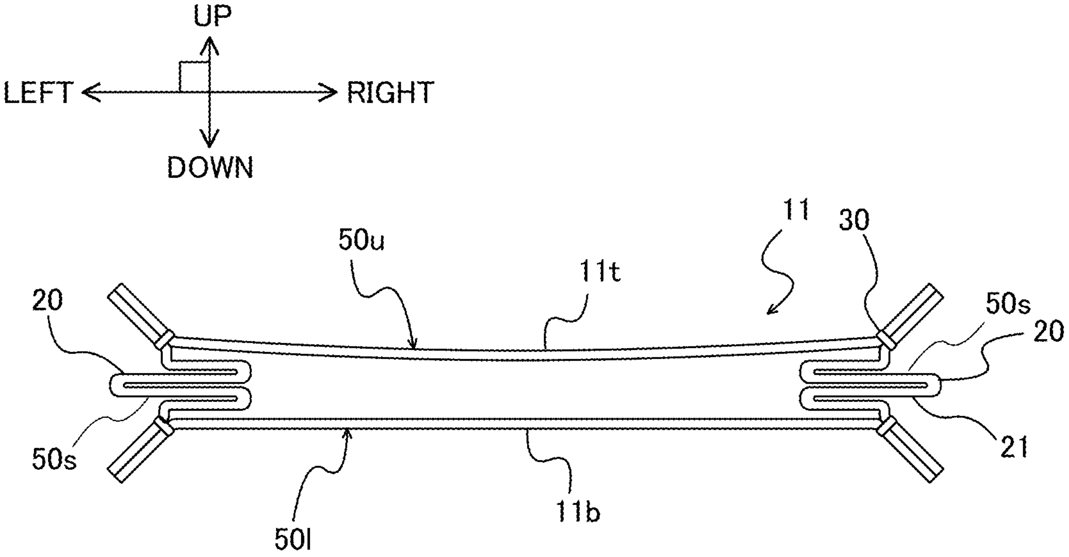
FIG. 18 is a schematic illustration of a mode of the seat cushion airbag of the present disclosure.

FIG. 17 and FIG. 18 are each a schematic illustration of a mode of the seat cushion airbag of the present disclosure, and more specifically, each schematically illustrate the seat cushion airbag cut along a width direction, i.e., the left-right direction shown in each drawing.

In the normal state, the seat cushion airbag 11 of the present disclosure shown in FIG. 17 is folded or collapsed as shown in FIG. 18. When supplied with the inflation fluid from the inflation fluid generation source (not shown), the seat cushion airbag 11 is expanded and inflated as shown in FIG. 17.

As shown in FIG. 17, in the seat cushion airbag 11, the standing wall 20 extends in the up-down direction in expansion and inflation. Accordingly, the standing wall 20 guides the deformation direction of the seat cushion airbag 11 such that the position in the upward direction of a top portion 11*t* becomes high.

As shown in FIG. 17 and FIG. 18, in the seat cushion airbag 11, a joint (specifically, a seam 30) between the standing wall 20 and the top portion 11*t* is present in an upper end portion of the standing wall 20, and a joint (i.e., a seam 30) between the standing wall 20 and a bottom portion 11*b* is present in a lower end portion of the standing wall 20. The joint between the standing wall 20 and the top portion 11*t* may be rephrased as a joint between the gusset body 50*s* and the upper sheet 50*u*. The joint between the standing wall 20 and the bottom portion 11*b* may be rephrased as a joint between the gusset body 50*s* and the lower sheet 50*l*.

The part, of the standing wall 20 described above, positioned in the vicinity of the joint 30 has a rigidity higher than the other part (referred to as a general portion 21 of the standing wall 20 as necessary) of the standing wall 20. Therefore, the part in the vicinity of the joint of the standing wall 20 is less likely to be deformed as compared with the general portion of the standing wall 20, and the shape of the part is easily maintained.

Therefore, in the seat cushion airbag 11 according to the mode, in expansion and inflation thereof, the general portion 21 of the standing wall 20 is preferentially deformed, thereby guiding the deformation direction of the seat cushion airbag 11 such that the position in the upward direction of the top portion 11*t* becomes high.

Therefore, in this case, in expansion and inflation, even if the internal pressure of the seat cushion airbag 11 is not so high, the position in the upward direction of the top portion 11*t* becomes sufficiently high.

In the mode, almost the entirety of the upper sheet 50*u* forms the top portion 11*t* of the seat cushion airbag 11.

Figure 19:
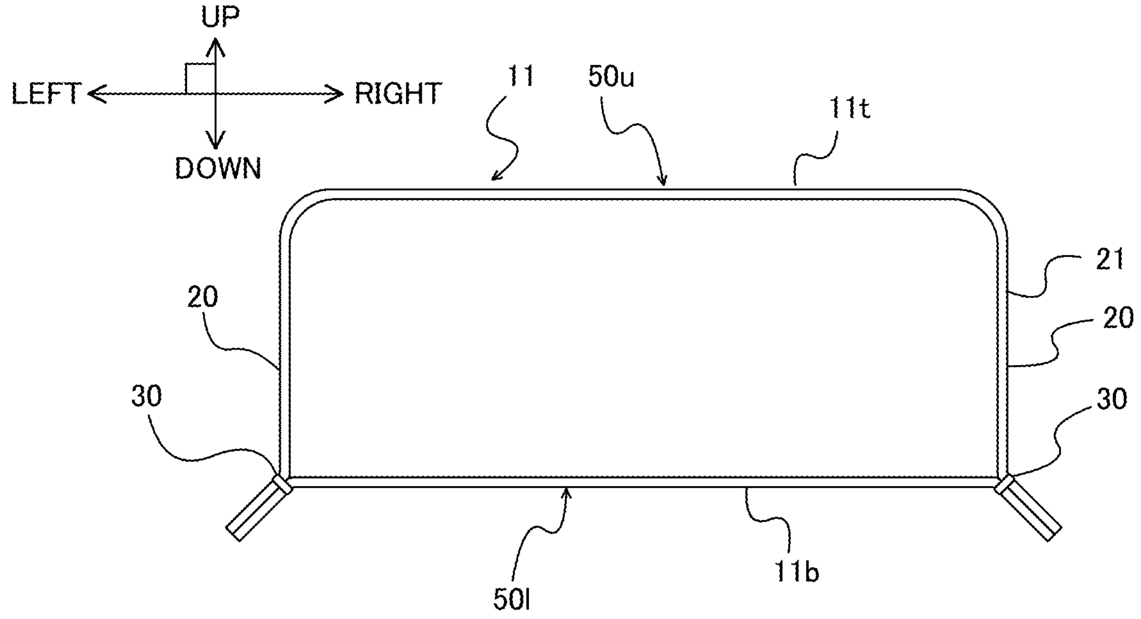
FIG. 19 is a schematic illustration of a mode of the seat cushion airbag of the present disclosure.

For example, as shown in FIG. 19, the gusset body 50*s* and the upper sheet 50*u* of the seat cushion airbag 11 of the present disclosure may be integrally formed, and an integrally formed body of the upper sheet 50*u* and the standing wall 20, and the lower sheet 50*l* may be sewn together, to be integrated.

In the seat cushion airbag 11 according to this mode, the standing wall 20 is also considered to be formed by a part of the upper sheet 50*u*.

In this mode as well, the standing wall 20 is considered to function as a gusset between the top portion 11*t* and the bottom portion 11*b*.

Figure 20:
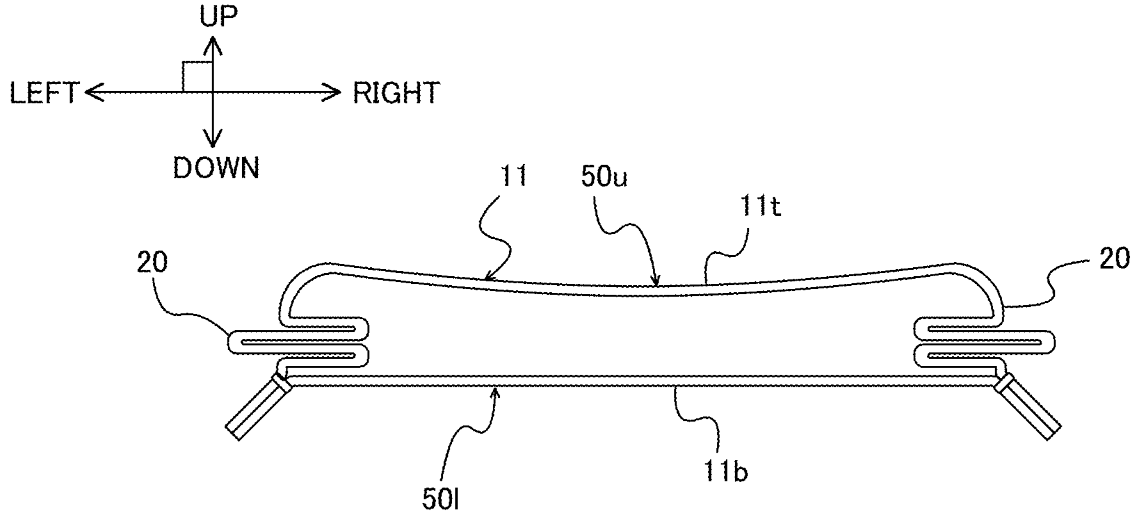
FIG. 20 is a schematic illustration of a mode of the seat cushion airbag of the present disclosure.

For reference, FIG. 19 and FIG. 20 are each a schematic illustration of a mode of the seat cushion airbag of the present disclosure, and more specifically, schematically illustrate the seat cushion airbag cut along the width direction.

In the normal state, the seat cushion airbag 11 according to the mode is also folded or collapsed as shown in FIG. 20. Then, when supplied with the inflation fluid from the inflation fluid generation source (not shown), the seat cushion airbag 11 is expanded and inflated as shown in FIG. 19.

As shown in FIG. 19, in expansion and inflation, in the seat cushion airbag 11, in order to cause the position in the upward direction of the top portion 11*t* being a part of the upper sheet 50*u* to be high, the standing wall 20 being another part of the upper sheet 50*u* and extending in the up-down direction guides the deformation direction of the seat cushion airbag 11 into the up-down direction.

Therefore, in this case as well, even if the internal pressure of the seat cushion airbag 11 in expansion and inflation is not so high, the position in the upward direction of the top portion 11*t* becomes sufficiently high.

Figure 21:
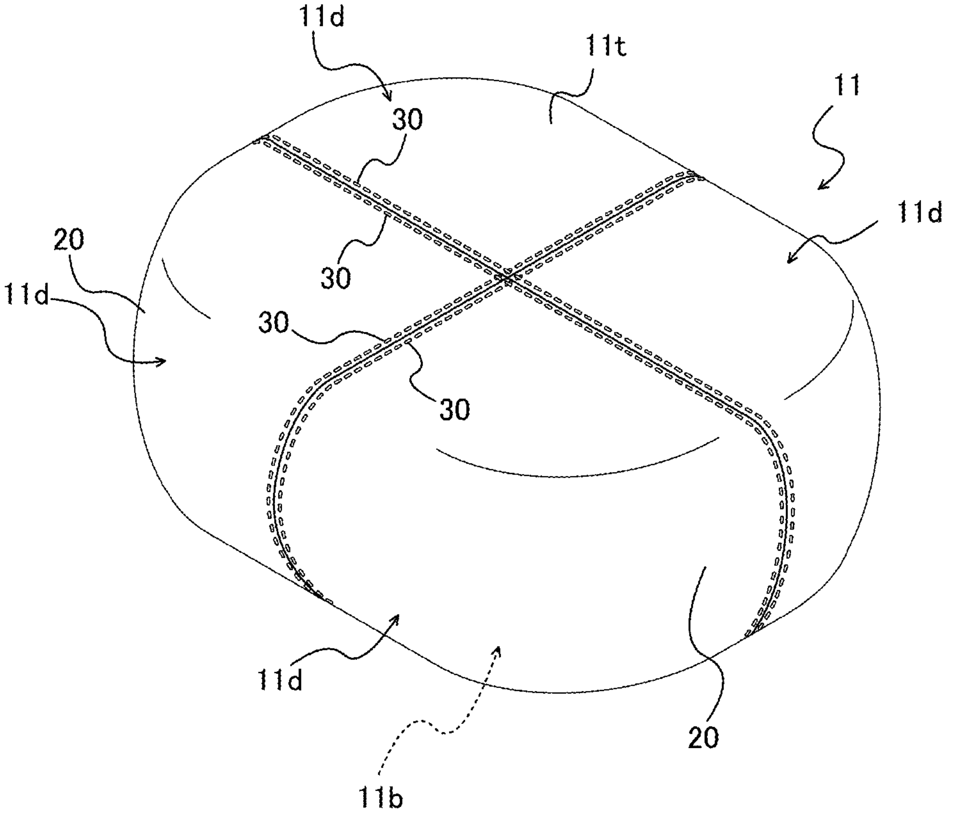
FIG. 21 is a schematic illustration of a mode of the seat cushion airbag of the present disclosure.

Further, for example, as shown in FIG. 21, the top portion 11*t*, the bottom portion 11*b*, and the standing wall 20 of the seat cushion airbag 11 of the present disclosure may each be divided into a plurality of divided bodies. Then, a divided body of the top portion 11*t*, a divided body of the standing wall 20 continuous with the divided body of the top portion 11*t*, and a divided body of the bottom portion 11*b* continuous with the divided body of the standing wall 20 may be integrated to form one airbag divided body 11*d*.

In the seat cushion airbag 11 according to the mode, four airbag divided bodies 11*d* are considered to form the seat cushion airbag 11 by being joined and integrated.

In the top portion 11*t* of the seat cushion airbag 11 according to the mode, a joint 30 between: the part, of a certain airbag divided body 11*d*, forming the top portion 11*t*; and the part, of another airbag divided body 11*d* adjacent thereto, forming the top portion 11*t* is present.

In the bottom portion 11*b* of the seat cushion airbag 11 according to the mode, a joint 30 between: the part, of a certain airbag divided body 11*d*, forming the bottom portion 11*b*; and the part, of another airbag divided body 11*d* adjacent thereto, forming the bottom portion 11*b* is present.)

Further, in the standing wall 20 of the seat cushion airbag 11 according to the mode, a joint 30 between: the part, of a certain airbag divided body 11*d*, forming the standing wall 20; and the part, of another airbag divided body 11*d* adjacent thereto, forming the standing wall 20 is present.

In this case as well, when the seat cushion airbag folded or collapsed in the normal state is expanded and inflated, the standing wall extending in the up-down direction guides the deformation direction of the seat cushion airbag such that the position in the upward direction of the top portion becomes high.

Therefore, in this case as well, even if the internal pressure of the seat cushion airbag in expansion and inflation is not so high, the position in the upward direction of the top portion becomes sufficiently high.

In the normal state, the standing wall is preferably folded back inward or outward of the seat cushion airbag. Accordingly, advantageously, the length of the standing wall in the up-down direction is made large in expansion and inflation, and the seat cushion airbag is easily collapsed or folded such that the external shape of the seat cushion airbag becomes small in the normal state.

As described above, in the normal state, when the standing wall is folded back inward or outward of the seat cushion airbag, a seam or a joint is also preferably provided at the crease part of the standing wall. Accordingly, the rigidity of the crease part is enhanced, and the shape of the crease is easily maintained in the normal state.

The seat cushion airbag of the present disclosure may have the standing wall extending in the up-down direction in at least two opposing regions in the side portion, and the length of the standing wall in the up-down direction is not particularly limited. The standing wall may be continuous over the entirety in the up-down direction, or may have a joint at any part in the up-down direction.

In the seat cushion airbag of the present disclosure, in order to cause the position in the upward direction of the top portion to be higher in expansion and inflation, the length in the up-down direction of the standing wall, i.e., the height of the standing wall, is preferably made long.

The length in the up-down direction of the standing wall of the seat cushion airbag of the present disclosure is preferably 120 mm or more when the internal pressure of the seat cushion airbag is 175 kPa in expansion and inflation. The upper limit of the length in the up-down direction of the standing wall is not particularly limited, and an example thereof is 300 mm or less.

For reference, the internal pressure in expansion and inflation of the conventional-type seat cushion airbag already described is about 350 kPa.

In the seat cushion airbag of the present disclosure, when the standing wall is present in two opposing regions in the side portion, the standing walls in the two regions may have the same shape or may have different shapes. Further, the lengths in the up-down direction of the standing walls in this case may be the same or may be different.

When the standing wall is present over the entirety in the circumferential direction of the seat cushion airbag, the length in the up-down direction of the standing wall may be the same or different over the entirety in the circumferential direction. In order to inhibit the submarine phenomenon already described, the length in the up-down direction of a front-side part of the standing wall is preferably longer than the length in the up-down direction of a rear-side part of the standing wall.)

As already described, the standing wall may be formed integrally with the top portion and/or the bottom portion, but more preferably, the standing wall formed separately from the top portion and the bottom portion is joined to the top portion and/or the bottom portion to be integrated. When the general portion of the standing wall is sandwiched by the parts having high rigidities, i.e., the joint between the top portion and the standing wall and the joint between the bottom portion and the standing wall, the force with which the general portion is deformed in the up-down direction in expansion and inflation is less likely to be transmitted from the general portion toward the top portion side and from the general portion toward the bottom portion side. For example, in expansion and inflation, when the general portion is deformed in the up-down direction, the upper sheet or the lower sheet is also conceivable to be bent and deformed in association therewith. If the upper sheet or the lower sheet is bent and deformed like this, deformation of the general portion in the up-down direction may be inhibited.

When the general portion is sandwiched by the above joints, deformation of the general portion in the up-down direction is less likely to be inhibited. Accordingly, even if the internal pressure in expansion and inflation is low, the length in the up-down direction of the seat cushion airbag becomes sufficiently large.

In the seat cushion airbag of the present disclosure, in order to stably support from the lower side the waist portion of the occupant sitting on the seat, the length in the width direction of the seat cushion airbag is preferably made long to some extent. The reason for this is as follows.

For example, in the conventional-type seat cushion airbag shown in FIG. 13 to FIG. 15, if the internal pressure in expansion and inflation is made high (FIG. 14), the position in the upward direction of the top portion of the seat cushion airbag becomes high to some extent. Therefore, according to the conventional-type seat cushion airbag, the part near the ischium of the occupant sitting on the seat portion of the seat is supportable from below.

However, in this case, with respect to the peripheral portion of the top portion of the conventional-type seat cushion airbag, the position in the upward direction does not become so high. Therefore, with the conventional-type seat cushion airbag, the hips of the occupant are difficult to be stably supported from below.

In contrast, with the seat cushion airbag of the present disclosure, due to the presence of the standing wall, a large region of the upper sheet is raised upward in expansion and inflation, whereby the area of the top portion is made large. Therefore, in the seat cushion airbag of the present disclosure, if the length in the width direction is made long, not only the vicinity of the ischium of the occupant but also up to the vicinity of the hips is brought into contact with the top portion, whereby the area of the part, of the top portion, being in contact with the occupant and supporting the occupant is made large, and the occupant is supported from below by the seat cushion airbag. Accordingly, the downward load acting on the seat cushion airbag due to the occupant is distributed to a large part of the seat cushion airbag.

That is, in the seat cushion airbag of the present disclosure, when the length in the width direction is made long, even if the internal pressure of the seat cushion airbag in expansion and inflation is made low, the occupant is very stably supported from the lower side by the seat cushion airbag.

Specifically, the length of the seat cushion airbag of the present disclosure in the width direction is preferably 280 mm or more. Alternatively, when the length in the width direction of the seat portion is assumed to be 100%, the size of the seat cushion airbag of the present disclosure is preferably 70% or more.

In the seat cushion airbag of the present disclosure, the length in the front-rear direction is not particularly limited, and may be about the same length as that in the width direction, or may be longer than the length in the width direction. However, if the seat cushion airbag is made compact, the weight of the seat cushion airbag is reduced.

Therefore, the length in the front-rear direction of the seat cushion airbag of the present disclosure is preferably shorter than the length in the width direction. In other words, preferably, the seat cushion airbag of the present disclosure has a longitudinal direction and a short direction and the longitudinal direction extends along the width direction of the seat portion.

Specifically, the length of the seat cushion airbag of the present disclosure in the front-rear direction is preferably 25% or more of the length of the seat cushion airbag in the width direction.

In order to more stably support the hips of the occupant from the lower side by the seat cushion airbag of the present disclosure, in expansion and inflation, the region, in the seat cushion airbag, corresponding to the hips of the occupant and further outside with respect to the hips in the width direction is preferably at a position higher in the upward direction than the region corresponding to the ischium of the occupant.

In other words, preferably, the seat cushion airbag of the present disclosure is disposed in the seat portion such that the longitudinal direction of the seat cushion airbag extends along the width direction of the seat portion, and the top portion of the seat cushion airbag has bulge portions at both end parts in the longitudinal direction. Each bulge portion is considered to be at a position higher in the upward direction than a center part in the longitudinal direction in expansion and inflation.

Specifically, in the seat cushion airbag of the present disclosure, the above bulge portion and the center part in the longitudinal direction are preferably separated from each other in the up-down direction by 5 mm or more in expansion and inflation.

In the seat cushion airbag of the present disclosure, the top portion and the bottom portion may be connected to each other by a tether. The tether is a member having a shape such as a string shape, a band shape, or a thread shape, and is also referred to as a connection rope or a strap. When the top portion and the bottom portion are connected to each other by the tether, the position in the upward direction of the top portion is highly accurately controlled in expansion and inflation. This is useful for more stably supporting the waist portion of the occupant from the lower side by the seat cushion airbag of the present disclosure.

Similarly, in the seat cushion airbag of the present disclosure, the standing walls opposing each other, in other words, the standing wall being a pair, are also preferably connected to each other by the tether. Connecting the above standing walls by the tether has an advantage that the relative position of the standing walls is highly accurately controlled in expansion and inflation.

When the seat cushion airbag of the present disclosure is in this mode, particularly preferably, the standing walls are at both end portions in the longitudinal direction of the seat cushion airbag, and the longitudinal direction of the seat cushion airbag extends along the width direction of the seat portion.

In this case, when the length in the width direction of the seat cushion airbag in expansion and inflation is highly accurately controlled, the waist portion of the occupant is more stably supported from the lower side by the seat cushion airbag.

Hereinafter, the seat cushion airbag and the seat cushion airbag device of the present disclosure will be described with reference to specific examples.

Embodiment 1

Figure 1:
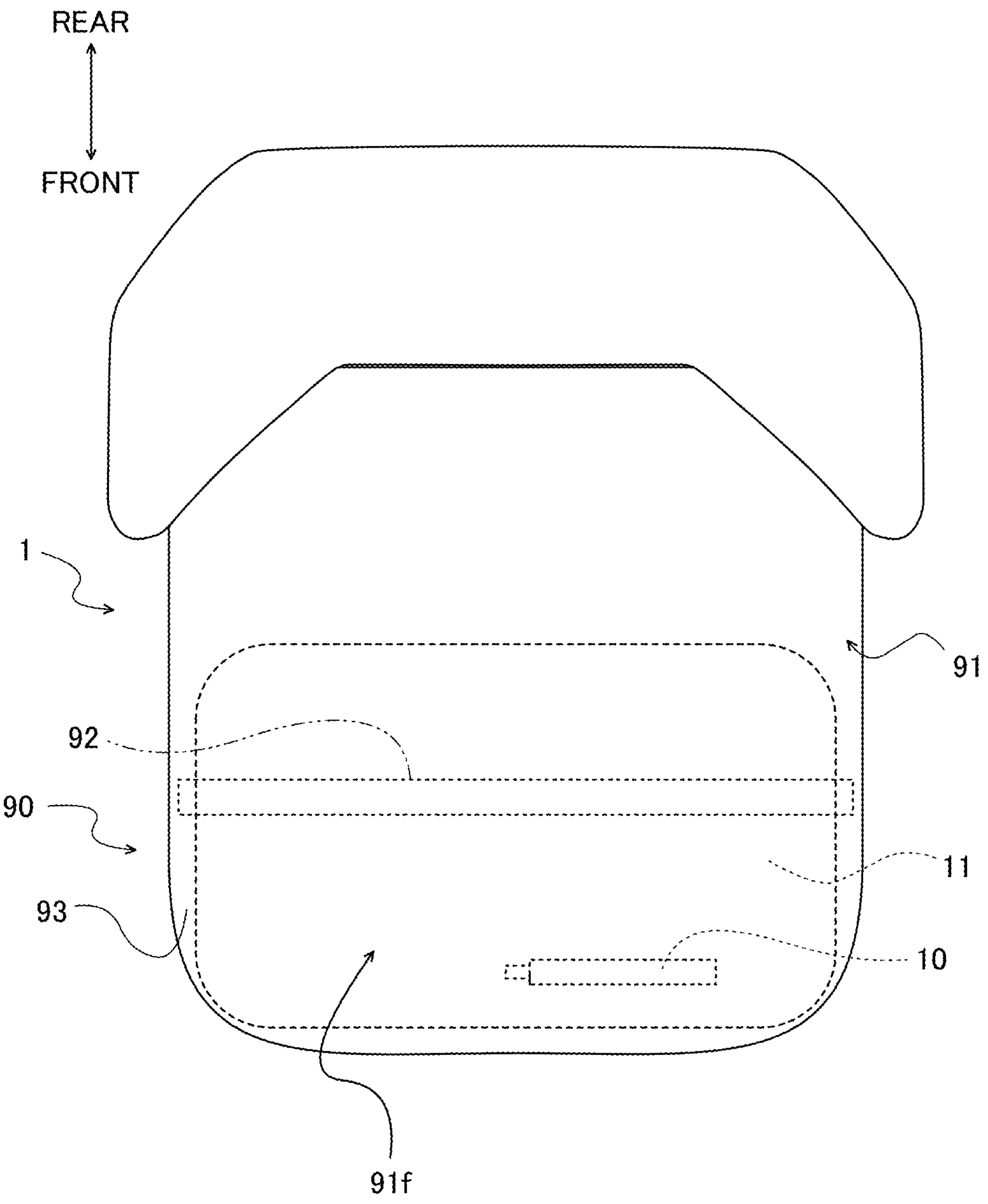
FIG. 1 is a schematic illustration of a seat cushion airbag of Embodiment 1 and a seat cushion airbag device of Embodiment 1.
Figure 2:
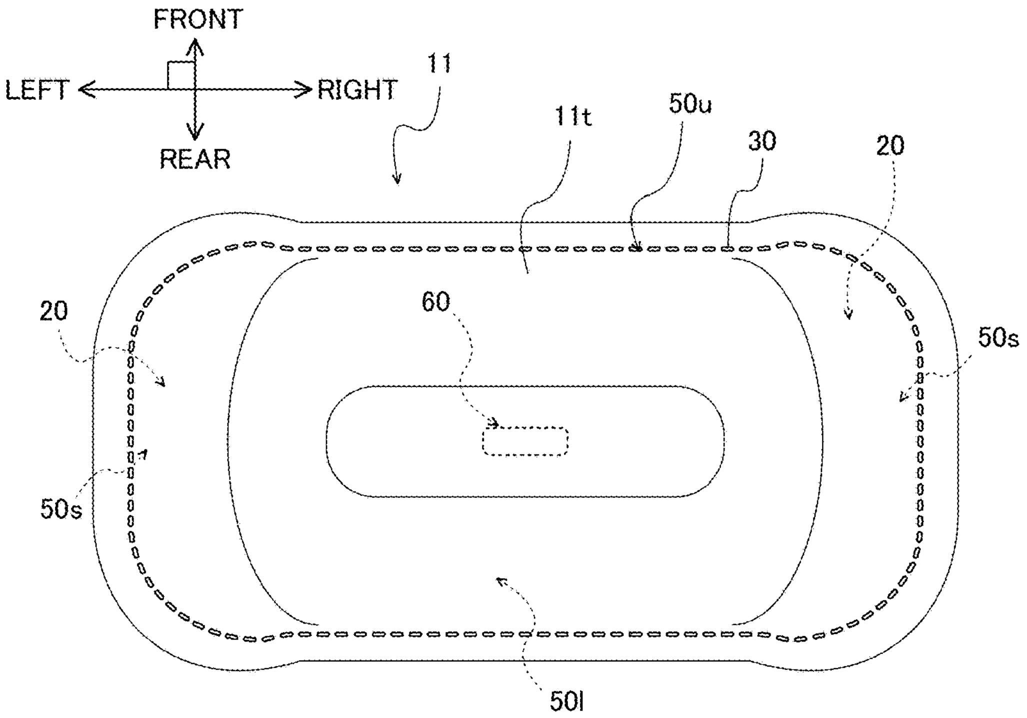
FIG. 2 is a schematic illustration of the seat cushion airbag of Embodiment 1.
Figure 3:
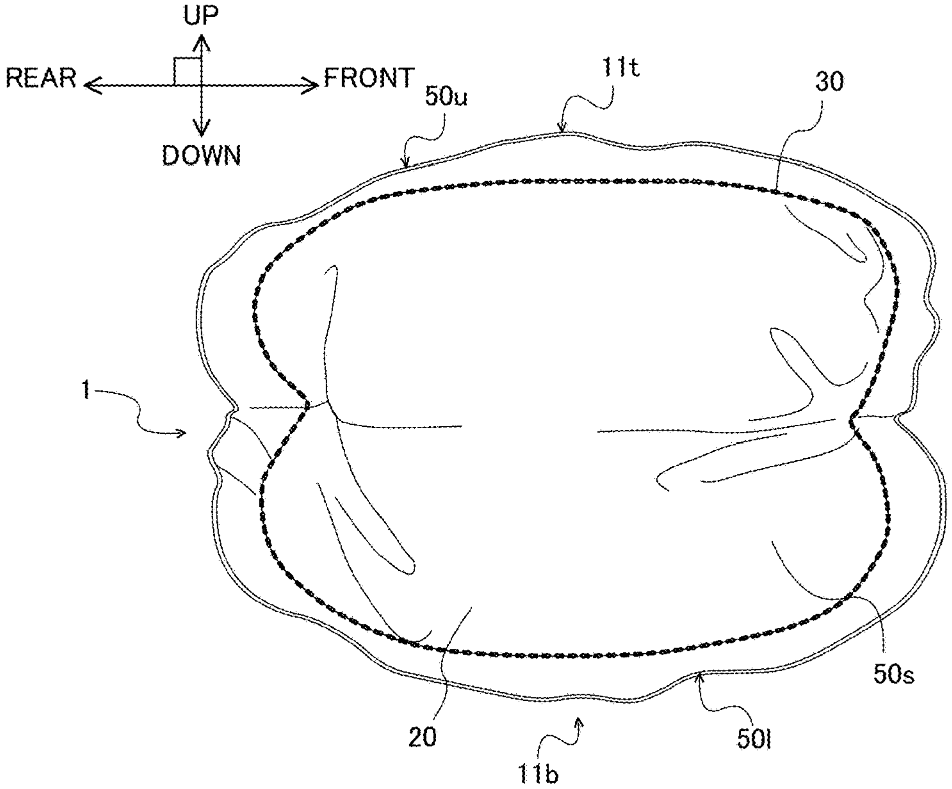
FIG. 3 is a schematic illustration of the seat cushion airbag of Embodiment 1.
Figure 4:
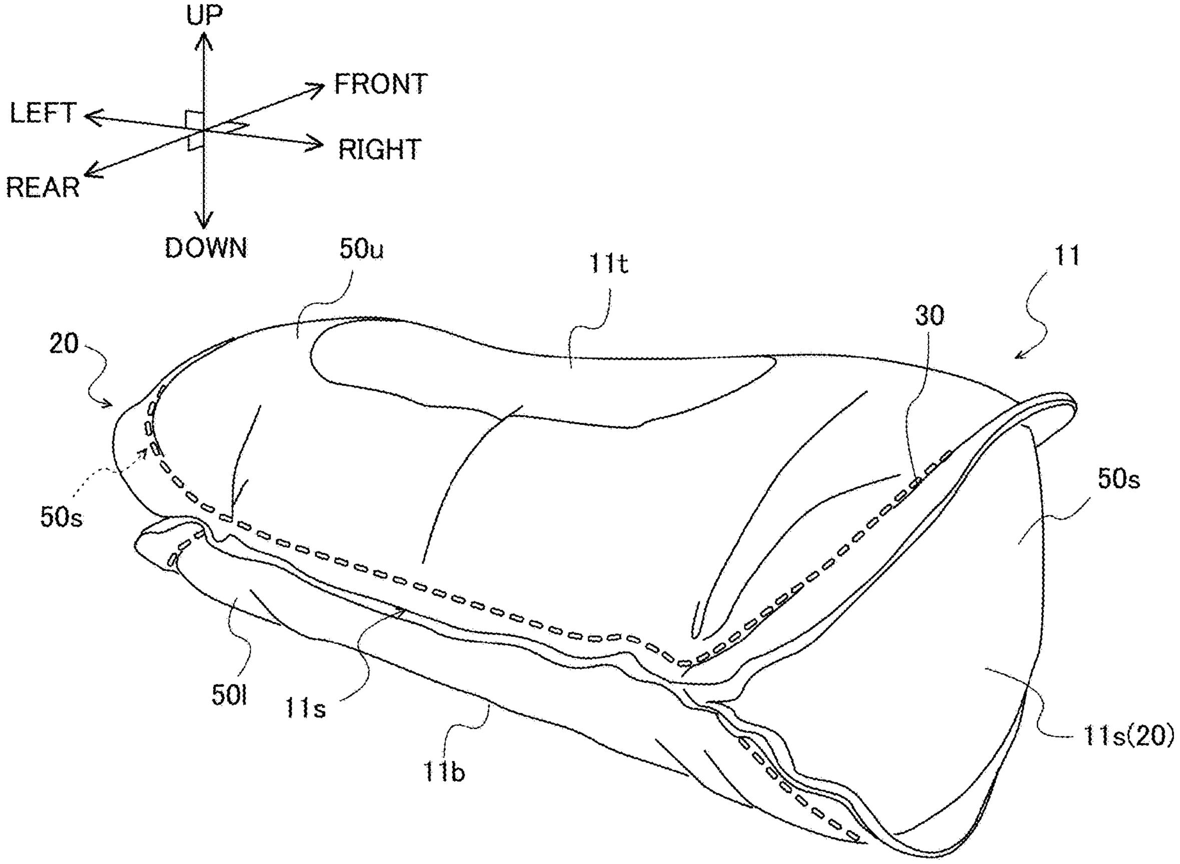
FIG. 4 is a schematic illustration of the seat cushion airbag of Embodiment 1.
Figure 5:
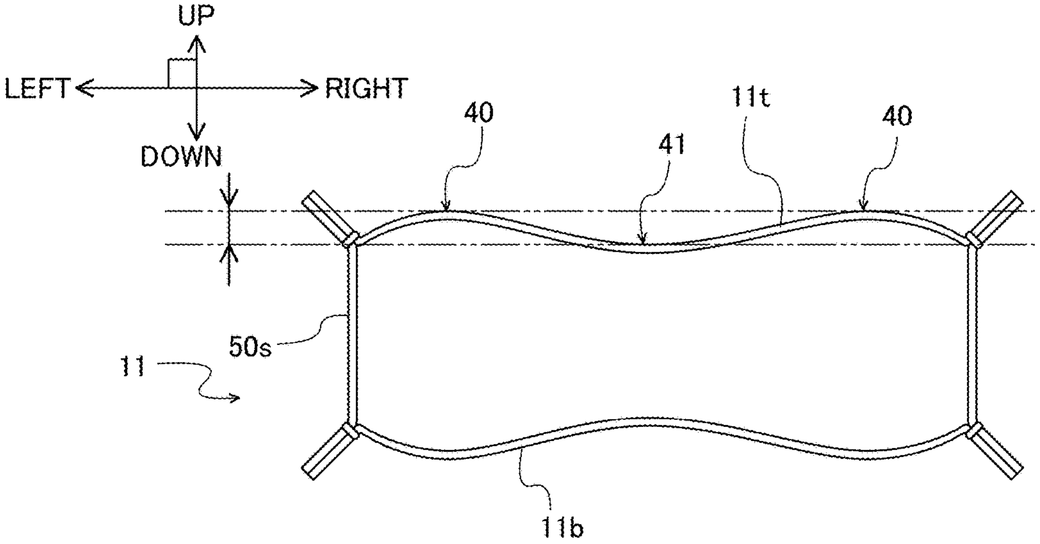
FIG. 5 is a schematic illustration of the seat cushion airbag of Embodiment 1.

FIG. 1 shows a schematic illustration of a seat cushion airbag of Embodiment 1 and a seat cushion airbag device of Embodiment 1 mounted to a seat portion of a seat. FIG. 2 shows a schematic illustration of the seat cushion airbag of Embodiment 1 viewed from above. FIG. 3 shows a schematic illustration of the seat cushion airbag of Embodiment 1 viewed from a side. FIG. 4 shows a schematic illustration of the seat cushion airbag of Embodiment 1 viewed from a side and from behind. FIG. 5 shows a schematic illustration of the seat cushion airbag of Embodiment 1 cut along the longitudinal direction.

Hereinafter, in Embodiment 1, "up", "down", "left", "right", "front", and "rear" refer to "up", "down", "left", "right", "front", and "rear" shown in each drawing. The left-right direction matches the width direction.

As shown in FIG. 1, a seat cushion airbag device 1 of Embodiment 1 includes a seat cushion airbag 11 and an inflation fluid generation source 10 of Embodiment 1.

The seat cushion airbag device of Embodiment 1 is mounted to a seat 90 for a vehicle, and more specifically, is disposed, in a seat portion 91 of the seat 90, below a seat cushion (not shown). Since a seat surface 93 of the seat portion 91 is formed by the upper surface of the seat cushion, the seat cushion airbag device 1 of Embodiment 1 is also considered to be disposed, in the seat portion 91, below the seat surface 93.

Inside the seat portion 91, the seat cushion airbag 11 is positioned above a seat bar 92 extending in the width direction in the vicinity of a center portion in the front-rear direction of the seat portion 91. Therefore, the seat cushion airbag 11 is considered to be disposed in a region between the center portion and a front end portion in the front-rear direction of the seat portion 91, i.e., a front-side region **91*f***.

More specifically, in a projection view obtained by projecting, downwardly from above, the seat portion 91 and the seat cushion airbag 11 disposed in the seat portion 91, 50 area % or more of the seat cushion airbag 11 of Embodiment 1 is disposed in the front-side region **91*f***.

The inflation fluid generation source 10 is disposed inside the seat cushion airbag 11 and is disposed further frontward with respect to the seat bar 92.

The inflation fluid generation source 10 of the seat cushion airbag device 1 of Embodiment 1 is a an inflator for generating a gas as the inflation fluid, is connected to a control device (not shown) for expanding and inflating the seat cushion airbag 11, and operates by receiving supply of electric power. The control device is an electronic control unit (ECU) of the vehicle.

As shown in FIG. 2, the seat cushion airbag 11 of Embodiment 1 is obtained by sewing together the upper sheet **50*u*, the lower sheet 50*l*, the two gusset bodies 50*s*, and a tether 60**.

The upper sheet **50*u* forms the top portion 11*t* of the seat cushion airbag 11, and the lower sheet 50*l* forms the bottom portion 11*b* of the seat cushion airbag 11**.

The upper sheet **50*u*, the lower sheet 50*l*, and the gusset body 50*s* are each made of a polyester woven fabric. Among these, the upper sheet 50*u* and the lower sheet 50*l* have approximately the same shape, with the longitudinal direction oriented in the left-right direction, and the short direction oriented in the front-rear direction. Therefore, the longitudinal direction of the seat cushion airbag 11** is considered to extend along the width direction.

As shown in FIG. 2, FIG. 3, and FIG. 4, the upper sheet **50*u* and the lower sheet 50*l* are sewn together to be integrated at a front-side part and a rear-side part in the peripheral portions thereof. The upper sheet 50*u* and the lower sheet 50*l*** are also considered to be sewn together to be integrated at both end portions in the short direction thereof.

One gusset body 50*s* is disposed at each of both end portions in the longitudinal direction of the seat cushion airbag 11. An upper part of each gusset body 50*s* is sewn to an end portion in the longitudinal direction of the upper sheet 50*u*, to be integrated. A lower part of each gusset body 50*s* is sewn to an end portion in the longitudinal direction of the lower sheet 50*l*, to be integrated.

As shown in FIG. 2, the seam 30 between the upper sheet 50*u*, the lower sheet 50*l*, and the two gusset bodies 50*s* is formed over the entirety in the circumferential direction along the peripheral portions of the upper sheet 50*u* and the lower sheet 50*l*. As shown in FIG. 3, the seam 30 is also considered to have been formed over the entirety in the circumferential direction along the peripheral portion of each gusset body 50*s*. Thus, the seat cushion airbag 11 of Embodiment 1 has an approximately box shape.

In the seat cushion airbag 11 of Embodiment 1, at both end portions in the short direction thereof, the seam 30 between the upper sheet 50*u* and the lower sheet 50*l*, and a part in the vicinity thereof form a part of a side portion 11*s*. At both end portions in the longitudinal direction of the seat cushion airbag 11, the part between: the seam 30 between the upper sheet 50*u* and the gusset body 50*s*; and the seam 30 between the lower sheet 50*l* and the gusset body 50*s* forms the remainder of the side portion 11*s*. The part is also the standing wall 20 extending in the up-down direction.

As shown in FIG. 2, in the seat cushion airbag 11 of Embodiment 1, the top portion 11*t* and the bottom portion 11*b* are connected to each other by the tether 60. The tether 60 is disposed inside the seat cushion airbag 11.

The seat cushion airbag 11 of Embodiment 1 is folded in the normal state. When supplied with the inflation fluid from the inflation fluid generation source 10, the seat cushion airbag 11 is expanded and inflated as shown in FIG. 2 to FIG. 4.

The seat cushion airbag 11 of Embodiment 1 is disposed in the seat portion 91 with the longitudinal direction of the seat cushion airbag 11 extending along the left-right direction which is the width direction. A center part in the longitudinal direction of the top portion 11*t* and a center part in the longitudinal direction of the bottom portion 11*b* are connected to each other by the tether 60. Therefore, in expansion and inflation, the center part in the longitudinal direction of the top portion 11*t* is at a position lower in the upward direction than both end parts in the longitudinal direction of the top portion 11*t*.

That is, the top portion 11*t* of the seat cushion airbag 11 of Embodiment 1 has the bulge portions 40 at both end portions in the longitudinal direction of the top portion 11*t*. Each bulge portion 40 is at a position higher in the upward direction than a center part 41 in the longitudinal direction in expansion and inflation.

The seat cushion airbag 11 of Embodiment 1 has, in regions positioned at both ends in the longitudinal direction in the side portion 11*s*, the standing wall 20 extending in the up-down direction. The standing wall 20 is deformed in the up-down direction in expansion and inflation. Therefore, the deformation direction of the seat cushion airbag 11 of Embodiment 1 in expansion and inflation is guided into the up-down direction by the standing wall 20.

Therefore, according to the seat cushion airbag 11 of Embodiment 1, even if the internal pressure in expansion and inflation is not so high, the position in the upward direction of the top portion 11*t* becomes sufficiently high. Accordingly, the seat cushion airbag 11 of Embodiment 1 supports the waist portion of the occupant sitting on the seat 90 with a sufficient force from the lower side, and accordingly, body of the occupant is stably restrained by the shoulder strap (not shown).

According to the seat cushion airbag 11 of Embodiment 1, the internal pressure in expansion and inflation need not be set to be high, and thus, the time lag between impact occurrence and upward deformation of the seat cushion airbag 11 is reduced.

Further, the seat cushion airbag 11 of Embodiment 1: is disposed in the seat portion 91 such that the longitudinal direction of the seat cushion airbag 11 extends along the width direction; and has the bulge portions 40 at both end portions in the longitudinal direction of the top portion 11*t*. Therefore, the seat cushion airbag 11 supports the entirety of the hips of the occupant from the lower side.

According to the seat cushion airbag 11 of Embodiment 1, the downward load acting on the seat cushion airbag 11 due to the occupant is distributed to a large part of the seat cushion airbag 11. Therefore, in the seat cushion airbag 11 of Embodiment 1, even if the internal pressure of the seat cushion airbag 11 in expansion and inflation is made low, the occupant is very stably supported from the lower side by the seat cushion airbag 11.

For reference, the length of the seat cushion airbag 11 of Embodiment 1 in the longitudinal direction, i.e., the width direction of the seat portion 91, is about 400 mm, and is 90% or more when the length in the width direction of the seat portion 91 is assumed to be 100%.

The length in the up-down direction of the standing wall 20 is about 150 mm when the internal pressure is 175 kPa in expansion and inflation.

The length of the seat cushion airbag 11 of Embodiment 1 in the short direction, i.e., the front-rear direction of the seat portion 91, is about 140 mm, and is about 35% of the length of the seat cushion airbag 11 in the width direction.

Further, each bulge portion 40 and the center part 41 in the longitudinal direction of the top portion 11*t* are separated from each other by about 20 mm in the up-down direction in expansion and inflation.

Embodiment 2

Figure 6:
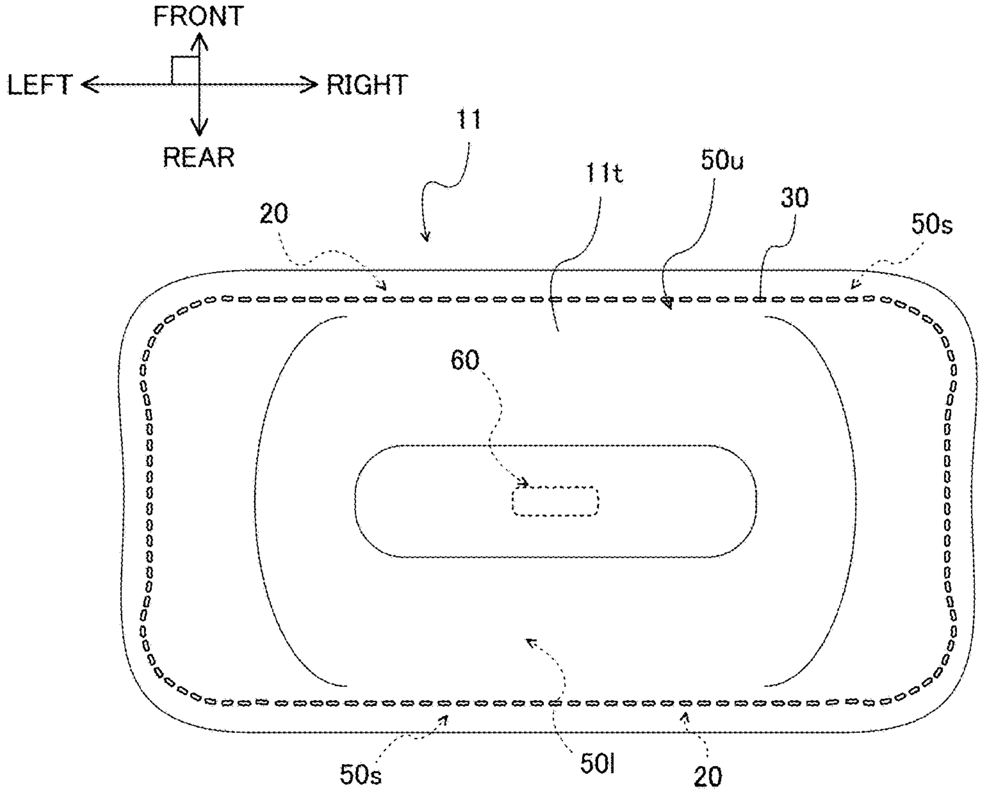
FIG. 6 is a schematic illustration of a seat cushion airbag of Embodiment 2.
Figure 7:
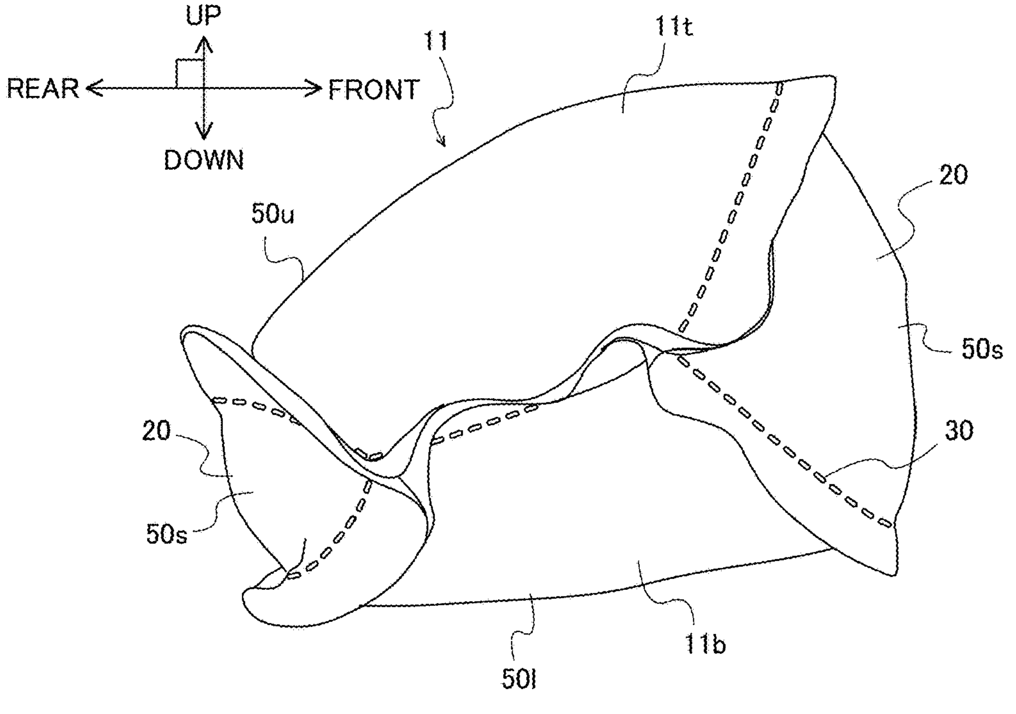
FIG. 7 is a schematic illustration of the seat cushion airbag of Embodiment 2.

FIG. 6 shows a schematic illustration of a seat cushion airbag of Embodiment 2 viewed from above. FIG. 7 shows a schematic illustration of the seat cushion airbag of Embodiment 2 viewed from a side.

The seat cushion airbag 11 of Embodiment 2 is largely different from the seat cushion airbag 11 of Embodiment 1 in the positions of a pair of the standing walls 20, and in that the top portion 11*t* and the bottom portion 11*b* are connected to each other by the tether 60 and the two standing walls 20 are connected to each other by the tether 60. The other configurations of the seat cushion airbag 11 of Embodiment 2 are approximately the same as those of the seat cushion airbag 11 of Embodiment 1.

As shown in FIG. 6 and FIG. 7, in the seat cushion airbag 11 of Embodiment 2, the pair of the standing walls 20 are disposed at both end portions in the front-rear direction, i.e., the short direction, of the seat cushion airbag 11.

The upper sheet 50*u* forms the top portion 11*t* of the seat cushion airbag 11, and the lower sheet 50*l* forms the bottom portion 11*b* of the seat cushion airbag 11.

The upper sheet 50*u* and the lower sheet 50*l* have approximately the same shape, with the longitudinal direction oriented in the left-right direction and the short direction oriented in the front-rear direction. The upper sheet 50*u* and the lower sheet 50*l* are sewn together to be integrated at a left-side part and a right-side part in the peripheral portions thereof. The upper sheet 50*u* and the lower sheet 50*l* are also considered to be sewn together to be integrated at both end portions in the longitudinal direction thereof.

One gusset body 50*s* is disposed at each of both end portions in the short direction of the seat cushion airbag 11. An upper part of each gusset body 50*s* is sewn to an end portion in the short direction of the upper sheet 50*u*, to be integrated. A lower part of each gusset body 50*s* is sewn to an end portion in the short direction of the lower sheet 50*l*, to be integrated.

As shown in FIG. 6, the seam 30 between the upper sheet 50*u*, the lower sheet 50*l*, and the two gusset bodies 50*s* is formed over the entirety in the circumferential direction along the peripheral portions of the upper sheet 50*u* and the lower sheet 50*l*. The seam 30 is also considered to have been formed over the entirety in the circumferential direction along the peripheral portion of each gusset body 50*s*. Thus, the seat cushion airbag 11 of Embodiment 2 also has an approximately box shape.

In the seat cushion airbag 11 of Embodiment 2, at both end portions in the longitudinal direction thereof, the seam 30 between the upper sheet 50*u* and the lower sheet 50*l*, and a part in the vicinity thereof form a part of the side portion 11*s*. At both end portions in the short direction of the seat cushion airbag 11, the part between: the seam 30 between the upper sheet 50*u* and the gusset body 50*s*; and the seam 30 between the lower sheet 50*l* and the gusset body 50*s* forms the remainder of the side portion 11*s*. The part is also the standing wall 20 extending in the up-down direction.

As shown in FIG. 7, in the seat cushion airbag of Embodiment 2, the sizes of the two gusset bodies 50*s* are different. Specifically, the length in the up-down direction of the gusset body 50*s* on the front side is longer than the length in the up-down direction of the gusset body 50*s* on the rear side.

Therefore, the length in the up-down direction of the standing wall 20 on the front side is longer than the length in the up-down direction of the standing wall 20 on the rear side, and the position in the upward direction of the top portion 11*t* is higher at a front-side part of the seat cushion airbag 11 than at a rear-side part of the seat cushion airbag 11.

In the seat cushion airbag 11 of Embodiment 2, the top portion 11*t* and the bottom portion 11*b* are connected to each other by the tether 60 (FIG. 6). Therefore, the top portion 11*t* of the seat cushion airbag 11 of Embodiment 2 has the bulge portions 40 similar to those of the top portion 11*t* of the seat cushion airbag 11 of Embodiment 1.

In the seat cushion airbag 11 of Embodiment 2, further, the two standing walls 20 are connected to each other by the tether 60. Accordingly, in the seat cushion airbag 11 of Embodiment 2, in expansion and inflation, the position in the upward direction of the top portion 11*t* is highly accurately controlled and the relative position of the standing walls is highly accurately controlled. Accordingly, the seat cushion airbag 11 of Embodiment 2 still further stably supports the waist portion of the occupant from the lower side.

Similar to the seat cushion airbag 11 of Embodiment 1, the seat cushion airbag 11 of Embodiment 2 has the standing wall 20 extending in the up-down direction. In expansion and inflation, the standing wall 20 guides the deformation direction of the seat cushion airbag 11 into the up-down direction.

Therefore, according to the seat cushion airbag 11 of Embodiment 2 as well, even if the internal pressure in expansion and inflation is not so high, the position in the upward direction of the top portion 11*t* becomes sufficiently high. Accordingly, the seat cushion airbag 11 of Embodiment 2 also supports the waist portion of the occupant sitting on the seat 90 with a sufficient force from the lower side, and accordingly, the upper body of the occupant is stably restrained by the shoulder strap (not shown).

According to the seat cushion airbag 11 of Embodiment 2 as well, the internal pressure in expansion and inflation need not be set to be high, and thus, the time lag between impact occurrence and upward deformation of the seat cushion airbag 11 is reduced.

Embodiment 3

Figure 8:
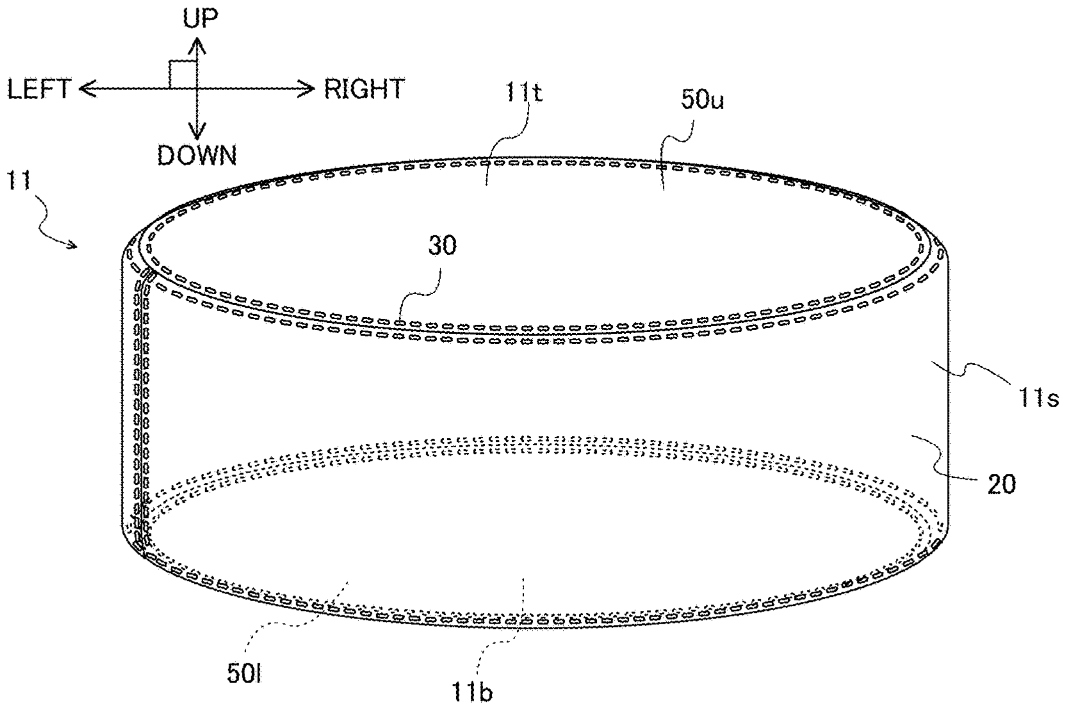
FIG. 8 is a schematic illustration of a seat cushion airbag of Embodiment 3.

FIG. 8 shows a schematic illustration of a seat cushion airbag of Embodiment 3 viewed from a side and from above.

As shown in FIG. 8, in the seat cushion airbag 11 of Embodiment 3, the entirety of the side portion 11*s* is formed by the standing wall 20.

In the seat cushion airbag 11 of Embodiment 3, the upper sheet 50*u* and the lower sheet 50*l* have approximately the same shape. The gusset body 50*s* has a long rectangular shape.

An upper part of the gusset body 50*s* is sewn to the peripheral portion of the upper sheet 50*u*, to be integrated. A lower part of the gusset body 50*s* is sewn to the peripheral portion of the lower sheet 50*l*, to be integrated. One end portion and another end portion in the longitudinal direction of the gusset body 50*s* are sewn to each other to be integrated.

As shown in FIG. 8, the seam 30 between the upper sheet 50*u*, the lower sheet 50*l*, and the gusset body 50*s* is formed over the entirety in the circumferential direction along the peripheral portions of the upper sheet 50*u* and the lower sheet 50*l*. The seam 30 is formed over the entirety in the circumferential direction along the peripheral portion of the gusset body 50*s*. Therefore, the seat cushion airbag 11 of Embodiment 3 has an approximately cylindrical shape.

Similar to the seat cushion airbag 11 of Embodiment 1, the seat cushion airbag 11 of Embodiment 3 also has the standing wall 20 extending in the up-down direction. In expansion and inflation, the standing wall 20 guides the deformation direction of the seat cushion airbag 11 into the up-down direction.

Therefore, according to the seat cushion airbag 11 of Embodiment 3 as well, even if the internal pressure in expansion and inflation is not so high, the position in the upward direction of the top portion 11*t* becomes sufficiently high. Accordingly, the seat cushion airbag 11 of Embodiment 3 also supports the waist portion of the occupant sitting on the seat 90 with a sufficient force from the lower side, and accordingly, the upper body of the occupant is stably restrained by the shoulder strap (not shown).

According to the seat cushion airbag 11 of Embodiment 3 as well, the internal pressure in expansion and inflation need not be set to be high, and thus, the time lag between impact occurrence and upward deformation of the seat cushion airbag 11 is reduced.

Embodiment 4

Figure 9:
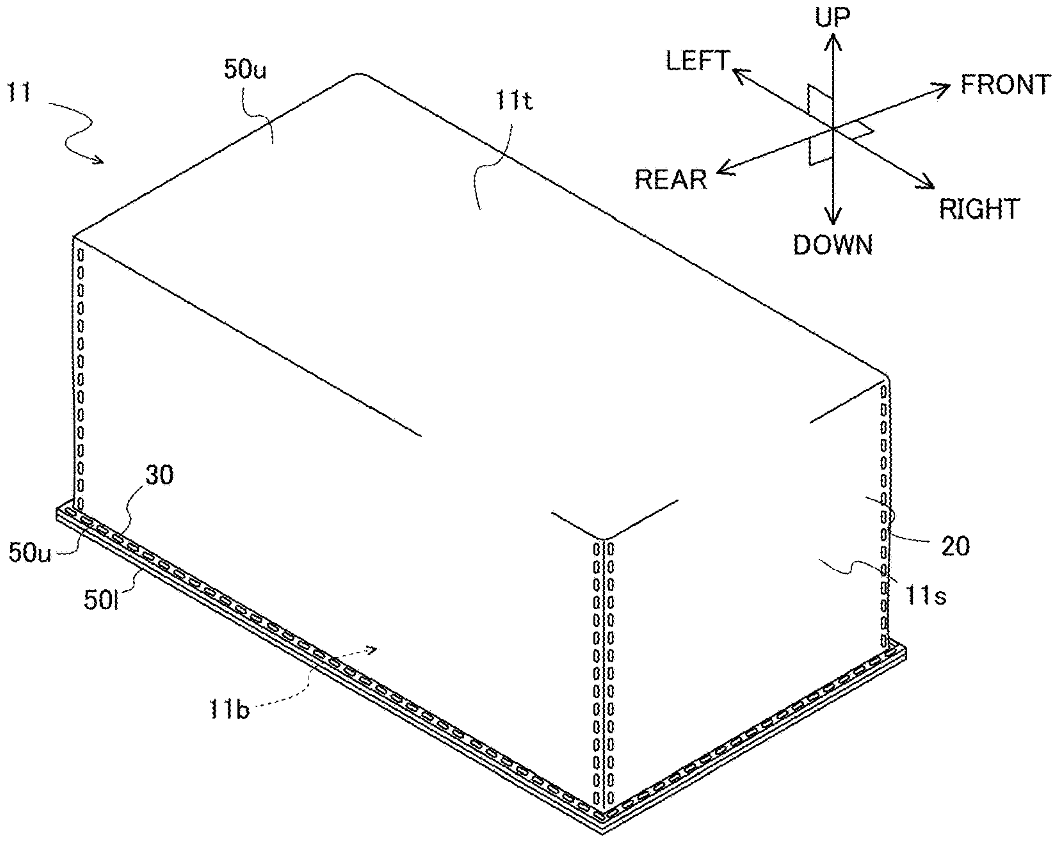
FIG. 9 is a schematic illustration of a seat cushion airbag of Embodiment 4.
Figure 10:
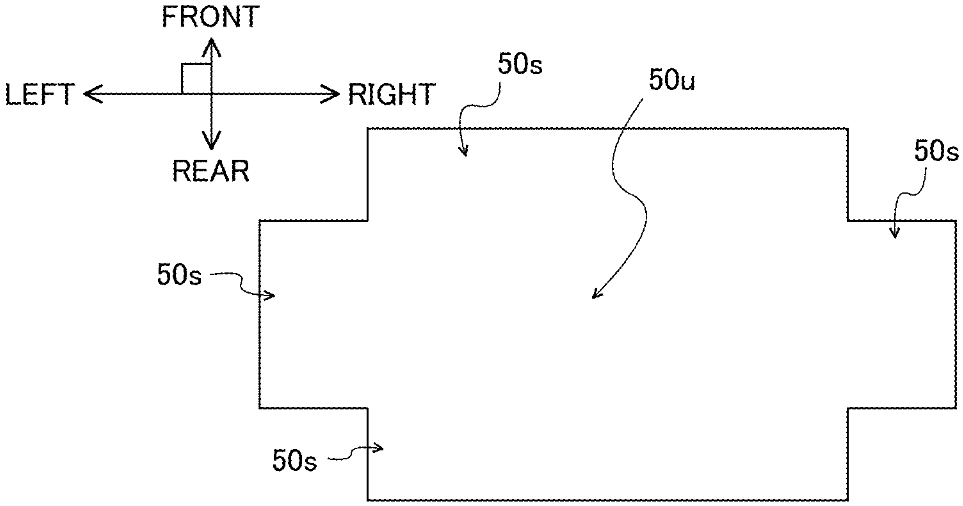
FIG. 10 is a schematic illustration of an upper sheet of the seat cushion airbag of Embodiment 4.
Figure 11:
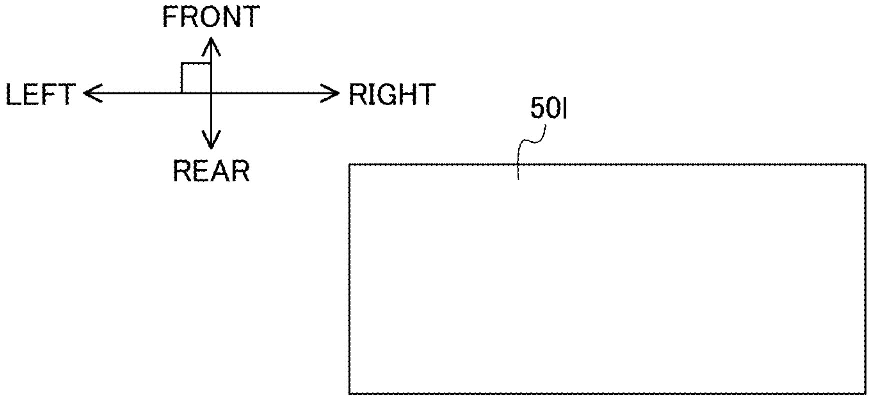
FIG. 11 is a schematic illustration of a lower sheet of the seat cushion airbag of Embodiment 4.

FIG. 9 shows a schematic illustration of a seat cushion airbag of Embodiment 4 viewed from a side and from above. FIG. 10 shows a schematic illustration of an upper cloth of the seat cushion airbag of Embodiment 4 viewed from above. FIG. 11 shows a schematic illustration of a lower cloth of the seat cushion airbag of Embodiment 4 viewed from above.

As shown in FIG. 9, in the seat cushion airbag 11 of Embodiment 4 as well, the entirety of the side portion 11*s* is formed by the standing wall 20.

As shown in FIG. 10, in the seat cushion airbag 11 of Embodiment 4, the upper sheet 50*u* and the gusset bodies 50*s* are integrally formed.

The lower sheet 50*l* has approximately the same shape as the part of the upper sheet 50*u* in an integrated article of the upper sheet 50*u* and the gusset bodies 50*s*.

As shown in FIG. 9, an upper part of each gusset body 50*s* is integrally formed with the peripheral portion of the upper sheet 50*u*. A lower part of each gusset body 50*s* is sewn to the peripheral portion of the lower sheet 50*l*, to be integrated. A side end portion of each gusset body 50*s* is sewn to a side end portion of another gusset body 50*s* adjacent thereto, to be integrated. The seat cushion airbag 11 of Embodiment 4 has an approximately rectangular prism shape.

Similar to the seat cushion airbag 11 of Embodiment 1, the seat cushion airbag 11 of Embodiment 4 also has the standing wall 20 extending in the up-down direction. In expansion and inflation, the standing wall 20 guides the deformation direction of the seat cushion airbag 11 into the up-down direction.

Therefore, according to the seat cushion airbag 11 of Embodiment 4 as well, even if the internal pressure in expansion and inflation is not so high, the position in the upward direction of the top portion 11*t* becomes sufficiently high.

Accordingly, the seat cushion airbag 11 of Embodiment 4 also supports the waist portion of the occupant sitting on the seat 90 with a sufficient force from the lower side, and accordingly, the upper body of the occupant is stably restrained by the shoulder strap (not shown).

According to the seat cushion airbag 11 of Embodiment 4 as well, the internal pressure in expansion and inflation need not be set to be high, and thus, the time lag between impact occurrence and upward deformation of the seat cushion airbag 11 is reduced.

Embodiment 5

Figure 12:
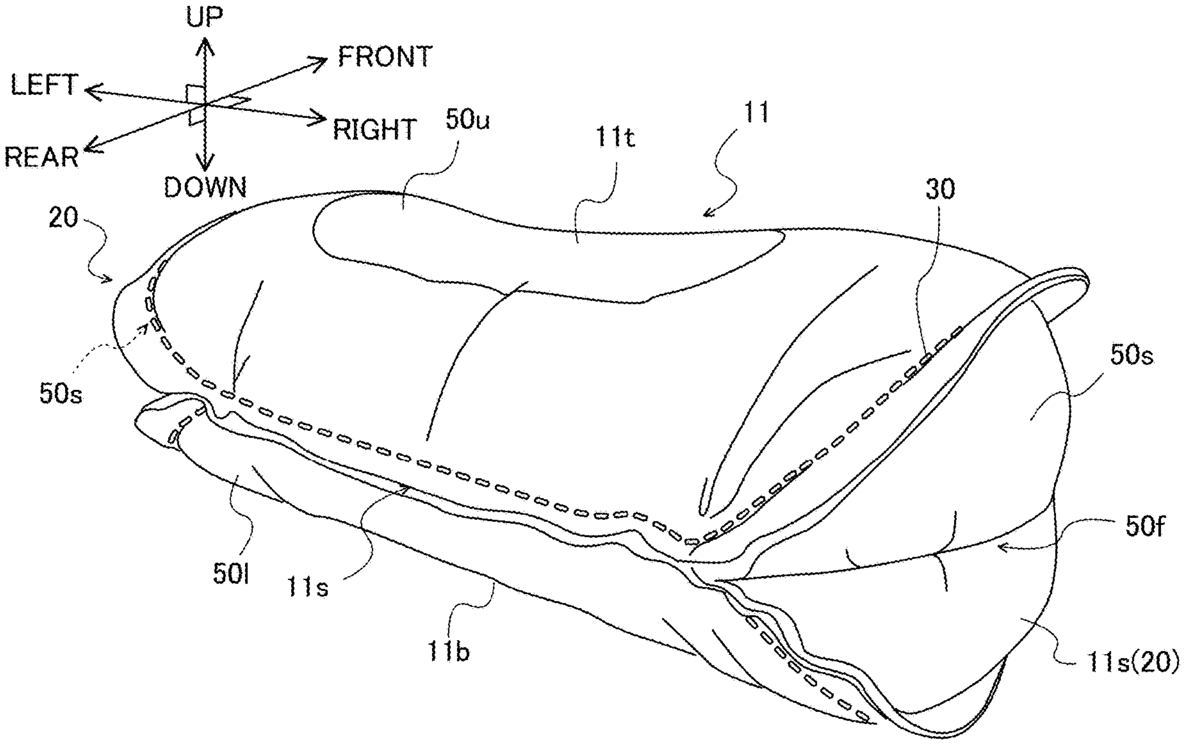
FIG. 12 is a schematic illustration of a seat cushion airbag of Embodiment 5 viewed from a side and from behind.

FIG. 12 shows a schematic illustration of a seat cushion airbag of Embodiment 5 viewed from a side and from behind.

Except for the shapes of the gusset body 50*s* and the standing wall 20, the seat cushion airbag 11 of Embodiment 5 is approximately the same as the seat cushion airbag 11 of Embodiment 1.

In the normal state, the gusset body 50*s* of the seat cushion airbag 11 of Embodiment 5 is folded back inward of the seat cushion airbag. Although not shown, a crease part 50*f* of the gusset body 50*s* is sewn. Therefore, in expansion and inflation, the length in the up-down direction of the standing wall 20 of the seat cushion airbag 11 of Embodiment 5 is longer than that of the standing wall 20 of the seat cushion airbag 11 of Embodiment 1.

In the seat cushion airbag 11 of Embodiment 5, an approximately center portion of the gusset body 50*s* is folded back inwardly, and accordingly, an approximately center portion of the standing wall 20 is also folded back inwardly. Therefore, in the seat cushion airbag 11 of Embodiment 5, the length in the up-down direction of the standing wall 20 in expansion and inflation is made larger and, in the normal state, the seat cushion airbag 11 is folded such that the external shape of the seat cushion airbag 11 becomes sufficiently small.

Since the crease part 50*f* of the standing wall 20 is sewn, the rigidity of the crease part 50*f* is enhanced, and the shape of the crease is easily maintained in the normal state. Accordingly, the seat cushion airbag 11 is folded in a more compact manner in the normal state.

While the present invention has been described above, the present invention is not limited to the embodiments and the like described above. Elements described in the embodiments and the like may be selected and combined as appropriate to implement the present invention, and various modifications may be made without deviating from the scope of the present invention.

The specification of the present invention discloses not only technical features based on the reference relationship of the claims at the time of filing of the present application but also technical features obtained by combining matters described in the claims as appropriate.

The invention claimed is:

1. A seat cushion airbag connected to an inflation fluid generation source and configured to be expanded and inflated by an inflation fluid being supplied to an inside of the seat cushion airbag,
- the seat cushion airbag
- being disposed, in a seat portion of a seat for a vehicle, in a region below a seat surface and between a center portion and a front end portion in a front-rear direction of the seat portion, and
- in expansion and inflation,
- having a top portion, a bottom portion, and a side portion located between the top portion and the bottom portion and forming at least part of an outer surface of the seat cushion airbag, and
- having, in at least two opposing regions in the side portion, a standing wall extending in an up-down direction, wherein
- the standing walls are formed by gusset bodies separate from the top portion and the bottom portion and joined to the top portion and the bottom portion, and
- a length in the up-down direction of one of the standing walls is different from a length in the up-down direction of another one of the standing walls opposing the one standing wall.

2. The seat cushion airbag according to claim 1, wherein a longitudinal direction thereof extends along a width direction of the seat portion.

3. The seat cushion airbag according to claim 2, wherein
- the top portion has bulge portions at both end parts in the longitudinal direction, and
- each bulge portion is at a position higher in an upward direction than a center part in the longitudinal direction in expansion and inflation.

4. The seat cushion airbag according to claim 1, wherein the standing wall has a gusset shape formed separately from the top portion and the bottom portion and integrated with the top portion and the bottom portion.

5. The seat cushion airbag according to claim 4, wherein in a normal state before expansion and inflation, the standing wall is folded back.

6. The seat cushion airbag according to claim 1, comprising a tether connecting the top portion and the bottom portion to each other.

7. The seat cushion airbag according to claim 1, comprising a tether connecting the standing walls to each other.

8. A seat cushion airbag device comprising:

an inflation fluid generation source; and a seat cushion airbag connected to the inflation fluid generation source and configured to be expanded and inflated by an inflation fluid being supplied to an inside of the seat cushion airbag, the seat cushion airbag being disposed, in a seat portion of a seat for a vehicle, in a region below a seat surface and between a center portion and a front end portion in a front-rear direction of the seat portion, and in expansion and inflation, having a top portion, a bottom portion, and a side portion located between the top portion and the bottom portion and forming at least part of an outer surface of the seat cushion airbag, and having, in at least two opposing regions in the side portion, a standing wall extending in an up-down direction, wherein the standing walls are formed by gusset bodies separate from the top portion and the bottom portion and joined to the top portion and the bottom portion, and a length in the up-down direction of one of the standing walls is different from a length in the up-down direction of another one of the standing walls opposing the one standing wall.

9. The seat cushion airbag device according to claim 8, wherein a longitudinal direction thereof extends along a width direction of the seat portion.

10. The seat cushion airbag device according to claim 9, wherein the top portion has bulge portions at both end parts in the longitudinal direction, and each bulge portion is at a position higher in an upward direction than a center part in the longitudinal direction in expansion and inflation.

11. The seat cushion airbag device according to claim 8, wherein the standing wall has a gusset shape formed separately from the top portion and the bottom portion and integrated with the top portion and the bottom portion.

12. The seat cushion airbag device according to claim 11, wherein in a normal state before expansion and inflation, the standing wall is folded back.

13. The seat cushion airbag device according to claim 8, comprising a tether connecting the top portion and the bottom portion to each other.

14. The seat cushion airbag device according to claim 8, comprising a tether connecting the standing walls to each other.

15. A seat cushion airbag connected to an inflation fluid generation source and configured to be expanded and inflated by an inflation fluid being supplied to an inside of the seat cushion airbag, the seat cushion airbag being disposed, in a seat portion of a seat for a vehicle, in a region below a seat surface and between a center portion and a front end portion in a front-rear direction of the seat portion, in expansion and inflation, having a top portion, a bottom portion, and a side portion located between the top portion and the bottom portion and forming at least part of an outer surface of the seat cushion airbag, having, in at least two opposing regions in the side portion, standing walls extending in an up-down direction, and comprising a tether connecting the top portion and the bottom portion to each other, wherein the standing walls are formed by gusset bodies separate from the top portion and the bottom portion and joined to the top portion and the bottom portion, and a center portion in a longitudinal direction of the top portion and a center portion in the longitudinal direction of the bottom portion are connected to each other by the tether.

16. The seat cushion airbag according to claim 15, wherein the longitudinal direction thereof extends along a width direction of the seat portion.

17. The seat cushion airbag according to claim 16, wherein the top portion has bulge portions at both end parts in the longitudinal direction, and each bulge portion is at a position higher in an upward direction than a center part in the longitudinal direction in expansion and inflation.

18. The seat cushion airbag according to claim 15, wherein the standing wall has a gusset shape formed separately from the top portion and the bottom portion and integrated with the top portion and the bottom portion.

19. The seat cushion airbag according to claim 18, wherein in a normal state before expansion and inflation, the standing wall is folded back.

20. The seat cushion airbag according to claim 15, wherein the tether connects the standing walls to each other.

* * * * *